(12) United States Patent
Yang et al.

(10) Patent No.: US 10,106,194 B2
(45) Date of Patent: Oct. 23, 2018

(54) DISPLAY APPARATUS AND VEHICLE HAVING THE SAME

(71) Applicant: LG ELECTRONICS INC., Seoul (KR)

(72) Inventors: Jaehyuk Yang, Seoul (KR); Wonseok Yoo, Seoul (KR); Seunghyeon Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/468,861

(22) Filed: Mar. 24, 2017

(65) Prior Publication Data

US 2017/0274931 A1    Sep. 28, 2017

(30) Foreign Application Priority Data

Mar. 25, 2016 (KR) .......................... 10-2016-0035876

(51) Int. Cl.
| | | |
|---|---|---|
| *B62D 15/02* | (2006.01) | |
| *B60W 10/184* | (2012.01) | |
| *B62D 1/04* | (2006.01) | |
| *G01C 21/26* | (2006.01) | |
| *G01C 21/36* | (2006.01) | |

(Continued)

(52) U.S. Cl.
CPC ......... *B62D 15/0295* (2013.01); *B62D 1/046* (2013.01); *B62D 15/021* (2013.01); *B62D 15/029* (2013.01); *G01C 21/265* (2013.01); *G01C 21/3652* (2013.01); *G01C 21/3661* (2013.01); *G06F 3/016* (2013.01);

(Continued)

(58) Field of Classification Search
CPC ...... B62D 15/021; B62D 1/046; B62D 15/02; B62D 15/046; B60Q 9/005; B66F 9/0755; B60W 10/20; E21B 7/046
See application file for complete search history.

(56) References Cited

U.S. PATENT DOCUMENTS

| | | | |
|---|---|---|---|
| 7,679,495 B2 | 3/2010 | Beutnagel-Buchner et al. | |
| 7,786,886 B2 | 8/2010 | Maruyama et al. | |
| 9,540,879 B2 * | 1/2017 | Kolpack ................. | E21B 7/046 |

(Continued)

FOREIGN PATENT DOCUMENTS

| | | |
|---|---|---|
| DE | 102014216105 | 2/2016 |
| EP | 1484234 | 12/2004 |

(Continued)

OTHER PUBLICATIONS

Extended European Search Report in European Application No. 17162795.3, dated Aug. 3, 2017, 9 pages (with English translation).

*Primary Examiner* — Yuri Kan
(74) *Attorney, Agent, or Firm* — Fish & Richardson P.C.

(57) ABSTRACT

A display apparatus, a vehicle including the same, includes a sensor unit configured to acquire vehicle periphery information, and an interface unit configured to acquire vehicle state information. The display apparatus also includes a display unit configured to display a first indicator indicating a target steering direction, a third indicator indicating a current steering state, and a second indicator displayed at a position between the first indicator and the third indicator. The display apparatus also includes a processor configured to determine the target steering direction based on the vehicle state information and the vehicle periphery information.

22 Claims, 34 Drawing Sheets

(51) Int. Cl.
*G06F 3/01* (2006.01)
*G06F 3/14* (2006.01)
*G06T 3/60* (2006.01)
*G06T 11/00* (2006.01)

(52) U.S. Cl.
CPC .............. *G06F 3/1423* (2013.01); *G06T 3/60* (2013.01); *G06T 11/00* (2013.01)

(56) References Cited

U.S. PATENT DOCUMENTS

| | | | |
|---|---|---|---|
| 2001/0026317 A1* | 10/2001 | Kakinami | B60Q 9/005 348/148 |
| 2002/0128750 A1* | 9/2002 | Kakinami | B60Q 9/005 701/1 |
| 2004/0083025 A1* | 4/2004 | Yamanouchi | B66F 9/0755 700/213 |
| 2006/0070795 A1 | 4/2006 | Meissner | |
| 2008/0143505 A1 | 6/2008 | Maruyama et al. | |
| 2008/0211651 A1* | 9/2008 | Beutnagel-Buchner | B62D 1/046 340/459 |
| 2011/0187518 A1 | 8/2011 | Strumolo et al. | |
| 2016/0297439 A1* | 10/2016 | Inoue | B60W 10/184 |
| 2017/0144688 A1 | 5/2017 | Pitzer | |

FOREIGN PATENT DOCUMENTS

| | | | |
|---|---|---|---|
| FR | 2744976 | 8/1997 | |
| JP | 10218006 A * | 8/1998 | ............ B62D 15/02 |
| JP | 2007526842 | 9/2007 | |
| JP | 2008150029 | 7/2008 | |
| JP | 2015024725 | 2/2015 | |
| KR | 10-2013-0021984 | 3/2013 | |
| KR | 10-2013-0027367 | 3/2013 | |

* cited by examiner

DISPLAY APPARATUS AND VEHICLE HAVING THE SAME

CROSS-REFERENCE TO RELATED APPLICATIONS

The present application claims the benefit of an earlier filing date and right of priority under 35 U.S.C. 119 and 35 U.S.C. 365 to Korean Patent Application No. 10-2016-0035876 filed on Mar. 25, 2016, the contents of which is hereby incorporated by reference in its entirety.

TECHNICAL FIELD

The present disclosure relates to a display apparatus and a vehicle having the same.

BACKGROUND

A vehicle is an apparatus that transports a user in a desired direction. A representative example of a vehicle may be an automobile. A vehicle is typically powered by a power source and may be classified as an internal combustion engine vehicle, an external combustion engine vehicle, a gas turbine vehicle, an electric vehicle, etc., according to a type of motor used.

An electric vehicle refers to a vehicle powered by an electric motor using electric energy. Electric vehicles include a pure electric vehicle, a hybrid electric vehicle (HEV), a plug-in hybrid electric vehicle (PHEV), a fuel cell electric vehicle (FCEV), etc.

Recently, intelligent vehicles have been actively developed to improve safety or convenience of a driver of a vehicle or a pedestrian outside the vehicle. An intelligent vehicle is an advanced vehicle using information technology (IT) and is also referred to as a smart vehicle. Some intelligent vehicles provide improved traffic efficiency by introduction of an advanced vehicle system and via association with an intelligent traffic system (ITS).

In addition, research into sensors mounted in intelligent vehicles has been actively conducted. For example, sensors such as a camera, an infrared sensor, a radar, a global positioning system (GPS), a Lidar, a gyroscope, etc. are typically used in an intelligent vehicle. In particular, a camera is often utilized to perform an important function in the role of human eyes.

Accordingly, with development of various sensors and electronic apparatuses, a vehicle including a driver assistance function for assisting driving of a user and improving driving safety and convenience is attracting considerable attention.

SUMMARY

Systems and techniques are disclosed that provide a display apparatus that displays steering control information based on a vehicle periphery situation, and a vehicle having the same.

In one aspect, a display apparatus may include a sensor unit configured to acquire vehicle periphery information, and an interface unit configured to acquire vehicle state information. The display apparatus may also include a display unit configured to display a first indicator indicating a target steering direction, a third indicator indicating a current steering state, and a second indicator displayed at a position between the first indicator and the third indicator. The display apparatus may also include a processor configured to determine the target steering direction based on the vehicle state information and the vehicle periphery information.

In some implementations, the processor may further be configured to detect, based on the vehicle periphery information, a movement route for the vehicle including at least one turning operation; and determine the target steering direction according to the movement route.

In some implementations, the processor may further be configured to detect a turning direction from the movement route; and determine, as the target steering direction, a direction that is turned by more than a predetermined angle relative to the turning direction detected from the movement route.

In some implementations, the current steering state may be a state where a vehicle wheel is steered with respect to a heading direction of a vehicle.

In some implementations, the second indicator may indicate a recommended steering speed by displaying a gradual shading that changes over time in a direction from the third indicator towards the first indicator.

In some implementations, the processor may further be configured to control the display unit so as to change a display position of at least one of the first indicator, the second indicator, or the third indicator when a steering operation is detected.

In some implementations, the processor may further be configured to change a display position of the first indicator so as to indicate a vehicle wheel direction which is changed according to the steering operation; and control the display unit to display the first indicator at the changed display position.

In some implementations, the processor may further be configured to shift, in a direction that is opposite the direction of steering, a position at which the third indicator is displayed according to the steering operation; and perform control such that the display unit displays the third indicator at the position which is shifted opposite the direction of steering. The third indicator may be displayed at the position which is shifted opposite the direction of steering such that the third indicator is maintained as being displayed at a fixed position with respect to a center position of steering.

In some implementations, the processor may further be configured to shift, in the direction that is opposite the direction of steering, a position at which the second indicator is displayed according to the steering operation; and perform control such that the display unit displays the second indicator at the position which is shifted opposite the direction of steering. The second indicator may be displayed at the position which is shifted opposite the direction of steering such that the second indicator is maintained as being displayed at a fixed position with respect to the center position of steering.

In some implementations, the processor may further be configured to control the display unit such that the second indicator designates a rotation of the steering by at least one full rotation based on detecting that rotation of the steering by at least one full rotation achieves a change in position of the first indicator to a position of the third indicator.

In some implementations, the processor may further be configured to control the display unit such that the second indicator indicates an over-steering operation based on the first indicator passing through a position of the third indicator.

In some implementations, the display apparatus may further include a haptic output unit configured to output a haptic signal through a steering input unit. The processor may further be configured to perform control such that the haptic output unit outputs a haptic that resists against the over-steering operation based on the over-steering operation being detected.

In some implementations, the processor may further be configured to perform control such that haptic output unit stops the output of the haptic when a steering operation exceeding a predetermined force is detected after outputting the haptic that resists against the over-steering operation.

In some implementations, the display apparatus may further include an audio output unit that is disposed at a left side or a right side of a user, and that is configured to output an alarm. The processor may further be configured to control the audio output unit to output a directional alarm indicating the over-steering operation based on the over-steering operation being detected.

In some implementations, the display unit may include a first display unit configured to display an indicator on a windshield of a vehicle; a second display unit configured to display the indicator, the second display unit being a display of a navigation device of the vehicle or a cluster disposed on a front of the vehicle; and a third display unit disposed on a steering input unit and configured to display the indicator.

In some implementations, the first display unit may further be configured to display a virtual steering image on the windshield; and display the first indicator, the second indicator, and the third indicator on the virtual steering image.

In some implementations, the first display unit may be configured to further display at least one of a first graphic image representing a recommended movement route or a second graphic image representing a movement route based on the current steering state.

In some implementations, the third display unit may further be configured to display the first indicator, the second indicator, and the third indicator directly on the steering input unit; and shift a display position of each of the first indicator, the second indicator, and the third indicator based on the steering input unit being rotated.

In some implementations, the processor may further be configured to, based on detecting an obstacle ahead from the vehicle periphery information, calculate an avoidance movement route including a turning operation to avoid the obstacle; and control the display unit to display the first indicator, the second indicator, and the third indicator according to the calculated avoidance movement route.

In some implementations, the processor may further be configured to, based on detecting a curve in a road, calculate the first indicator, the second indicator, and the third indicator based on a direction of the detected curve in the road; and control the display unit to display the calculated first indicator, the second indicator, and the third indicator.

In some implementations, the processor may further be configured to, based on an autonomous steering operation being performed, maintain a steering input unit at a fixed rotation angle; and control the display unit to display at least one of the first indicator, the second indicator, or the third indicator on the steering input unit without rotation of the steering input unit.

In another aspect, a vehicle may include the display apparatus described above.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

DETAILED DESCRIPTION

Figure 1:
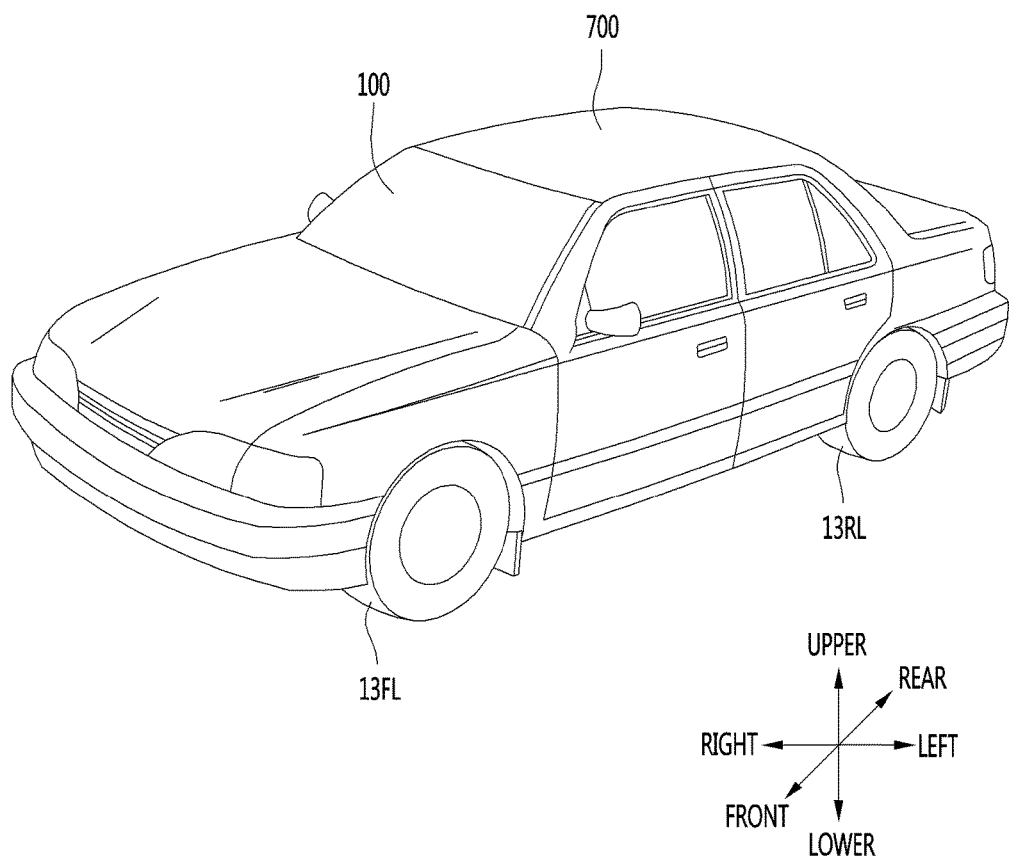
FIG. 1 is a diagram illustrating an example appearance of a vehicle having a display apparatus.

In some driving scenarios, a driver may face difficulty in make a turn for changing a movement direction of a vehicle, for example in the case of driving on a curved or narrow road, performing a lane change, or engaging in obstacle avoidance. In particular, a driver may face difficulty in precisely controlling a steering of the vehicle when making a turn, and when the steering is erroneously operated, an accident may occur.

Some vehicle technologies provide a parking guide route or provide simple information about a steering operation during parking-related operations of a vehicle. However, such technologies are limited to provision of information at a stopped vehicle state or a low-speed vehicle state. Also such technologies are limited because steering information is provided in connection with a current position only when a parking spot is determined or a positon at which the vehicle is to be taken out is determined.

According to implementations described herein, a display apparatus displays one or more indicators that inform a driver of how to perform an appropriate steering operation based on the particular driving state of the vehicle and its driving surroundings. For example, the display apparatus may acquire vehicle periphery information and vehicle state information, and determine a target steering direction based on the acquired information. The display apparatus may then display a first indicator indicating the target steering direction, as well as a third indicator indicating a current steering state and a second indicator displayed at a position between the first indicator and the third indicator.

The displayed indicators may inform a driver of various aspects of appropriate steering to safely and accurately maneuver the vehicle in the current driving state. As such, the display apparatus may provide intuitively understandable steering control information to a driver based on a vehicle periphery situation.

A vehicle as described in this specification may include a car and a motorcycle. Hereinafter, a car will be focused upon.

A vehicle as described in this specification may be, for example, an internal combustion engine vehicle including an engine as a power source, a hybrid vehicle including both an engine and an electric motor as a power source, or an electric vehicle including an electric motor as a power source.

In the following description, the left of a vehicle refers to the left of the vehicle in the direction of travel, and the right of the vehicle refers to the right of the vehicle in the direction of travel.

In the following description, a left hand drive (LHD) vehicle will be focused upon unless otherwise stated.

In the following description, the display apparatus is provided in a vehicle to exchange information necessary for data communication with the vehicle and to perform a driver assistance function. A set of some units of the vehicle may be defined as a display apparatus.

When the display apparatus is separately provided, at least some units (see FIG. 2) of the display apparatus are not included in the display apparatus but may be units of the vehicle or units of another apparatus mounted in the vehicle. Such external units transmit and receive data via an interface of the display apparatus and thus may be understood as being included in the display apparatus.

Hereinafter, for convenience of description, a display apparatus is described with reference to the units shown in FIG. 2.

Referring to the example of FIG. 1, a vehicle may include vehicle wheels 13FL and 13RL rotated by a power source and a display apparatus for providing steering control information to a user.

Specifically, the display apparatus provides steering control information based on internal/external information of the vehicle so as to assist a driver in controlling a steering, thus enhancing convenience of the driver and achieving safe driving. For example, when steering control is necessary, the display apparatus displays a recommended steering position and a recommended steering operation speed to aid in the steering operation of the driver.

Figure 2:
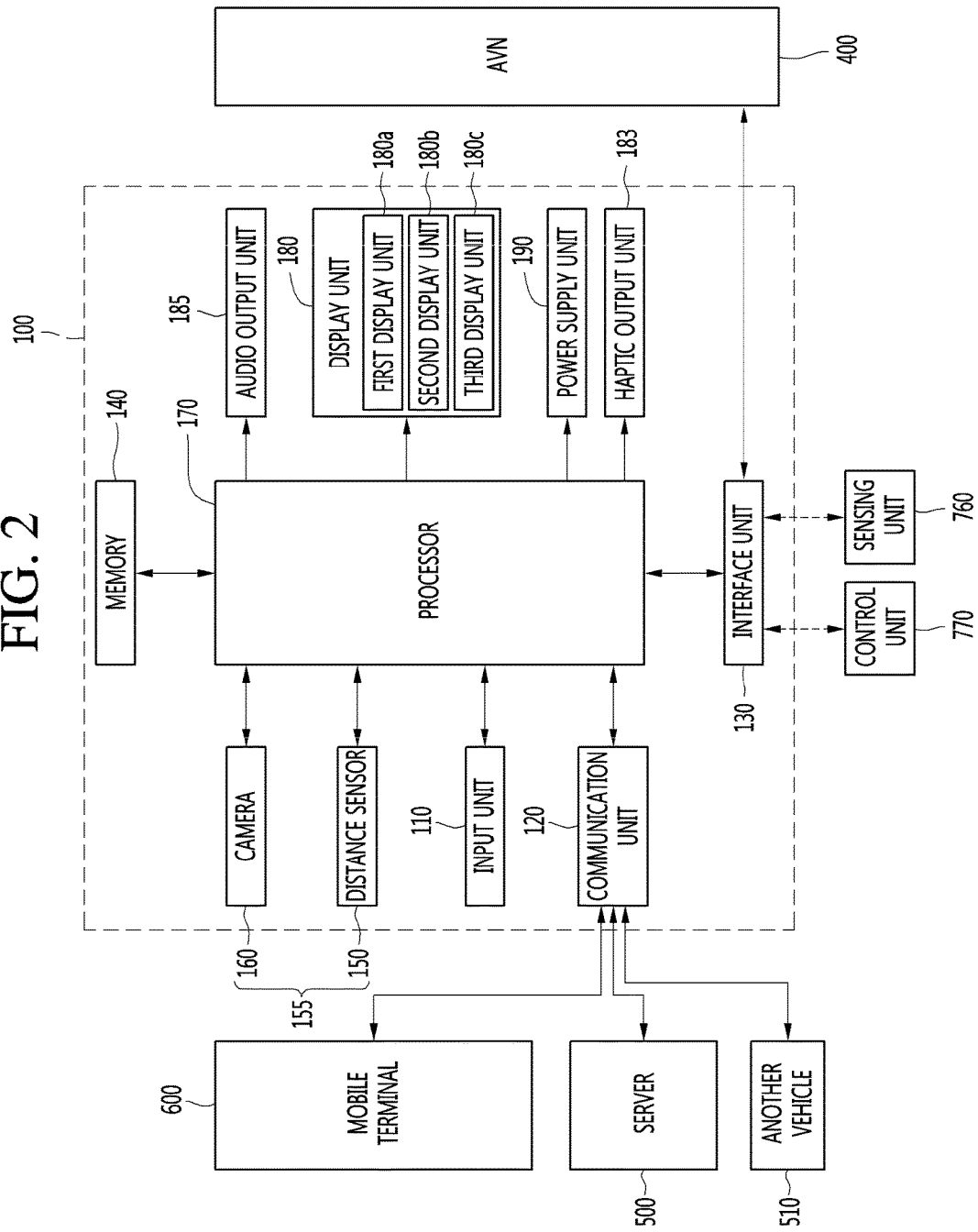
FIG. 2 is a block diagram illustrating an example of a display apparatus.

Referring to FIG. 2, such a display apparatus 100 may include an input unit 110, a communication unit 120, an interface 130, a memory 140, a sensor unit 155, a processor 170, a display unit 180, an audio output unit 185 and a power supply 190. The units of the display apparatus 100 shown in FIG. 2 are not essential to implementation of the display apparatus 100 and thus the display apparatus 100 described in the present specification may have components greater or less in number than the number of the above-described components.

Each component will now be described in detail. The display apparatus 100 may include the input unit 110 for receiving user input.

For example, a user may input a signal for setting a driver assistance function provided by the display apparatus 100 or an execution signal for turning the display apparatus 100 on/off.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the display apparatus 100 may include the communication unit 120 for communicating with another vehicle 510, a terminal 600 and a server 500.

The display apparatus 100 may receive communication information including at least one of navigation information, driving information of another vehicle and traffic information via the communication unit 120. In contrast, the display apparatus 100 may transmit information on this vehicle via the communication unit 120.

In detail, the communication unit 120 may receive at least one of position information, weather information and road traffic condition information (e.g., transport protocol experts group (TPEG), etc.) from the mobile terminal 600 and/or the server 500.

The communication unit 120 may receive traffic information from the server 500 having an intelligent traffic system (ITS). Here, the traffic information may include traffic signal information, lane information, vehicle surrounding information or position information.

In addition, the communication unit 120 may receive navigation information from the server 500 and/or the mobile terminal 600. Here, the navigation information may include at least one of map information related to vehicle driving, lane information, vehicle position information, set destination information and route information according to the destination.

For example, the communication unit 120 may receive the real-time position of the vehicle as the navigation information. In detail, the communication unit 120 may include a global positioning system (GPS) module and/or a Wi-Fi (Wireless Fidelity) module and acquire the position of the vehicle.

In addition, the communication unit 120 may receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information, and turn signal information.

In addition, when a user rides in the vehicle, the mobile terminal 600 of the user and the display apparatus 100 may pair with each other automatically or by executing a user application.

The communication unit 120 may exchange data with the other vehicle 510, the mobile terminal 600 or the server 500 in a wireless manner.

In detail, the communication module 120 can perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit module 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the display apparatus 100 may pair with the mobile terminal located inside the vehicle using a short-range communication method and wirelessly exchange data with the other vehicle 510 or the server 500 using a long-distance wireless communication module of the mobile terminal.

In detail, the display apparatus 100 may receive at least one of driving information of another vehicle, navigation information and sensor information via the interface 130.

Specifically, the display device 100 may receive at least one of pieces of driving information of another vehicle, navigation information, and sensor information through the interface unit 130. The information collected through the interface unit 130 may be included in vehicle periphery information and vehicle state information. Specifically, the vehicle state information includes vehicle steering information, position information, acceleration information, acceleration speed information, heading sensor information, yaw sensor information, vehicle wheel sensor information, and the like.

To this end, the interface 130 may perform data communication with at least one of the controller 770 of the vehicle, an audio-video-navigation (AVN) apparatus 400 and the sensing unit 760 using a wired or wireless communication method.

In detail, the interface 130 may receive navigation information by data communication with the controller 770, the AVN apparatus 400 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a vehicle wheel sensor, a vehicle speed sensor, a vehicle tilt sensor, a battery sensor, a fuel sensor, a tire sensor, a steering sensor based on rotation of the steering input unit (e.g., a steering wheel), a vehicle interior temperature sensor, a vehicle interior humidity sensor, a door sensor, etc. The position module may include a GPS module for receiving GPS information.

The interface 130 may receive user input via the user input unit 110 of the vehicle. The interface 130 may receive user input from the input unit of the vehicle or via the controller 770. That is, when the input unit is provided in the vehicle, user input may be received via the interface 130.

In addition, the interface 130 may receive traffic information acquired from the server. The server 500 may be located at a traffic control surveillance center for controlling traffic. For example, when traffic information is received from the server 500 via the communication unit 120 of the vehicle, the interface 130 may receive traffic information from the controller 770.

Next, the memory 140 may store a variety of data for overall operation of the display apparatus 100, such as a program for processing or control of the controller 170.

In addition, the memory 140 may store data and commands for operation of the display apparatus 100 and a plurality of application programs or applications executed in the display apparatus 100. At least some of such application programs may be downloaded from an external server through wireless communication. At least one of such application programs may be installed in the display apparatus 100 upon release, in order to provide the basic function (e.g., the driver assistance information guide function) of the display apparatus 100.

Such application programs may be stored in the memory 140 and may be executed to perform operation (or function) of the display apparatus 100 by the processor 170.

The memory 140 may store data for checking an object included in an image. For example, the memory 140 may store data for checking a predetermined object using a predetermined algorithm when the predetermined object is detected from an image of the vicinity of the vehicle acquired through the camera 160.

For example, the memory 140 may store data for checking the object using the predetermined algorithm when the predetermined algorithm such as a lane, a traffic sign, a two-wheeled vehicle and a pedestrian is included in an image acquired through the camera 160.

The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the display apparatus 100 may operate in association with a network storage for performing a storage function of the memory 140 over the Internet.

Next, the display apparatus 100 may further include the sensor unit 155 for sensing objects located in the vicinity of the vehicle. The display apparatus 100 may include the sensor unit 155 for sensing peripheral objects and may receive the sensor information obtained by the sensing unit 760 of the vehicle via the interface 130. The acquired sensor information may be included in the information on the vehicle surrounding information.

The sensor unit 155 may include at least one of a distance sensor 150 for sensing the position of an object located in the vicinity of the vehicle and a camera 160 for capturing the image of the vicinity of the vehicle.

First, the distance sensor 150 may accurately sense the position of the object located in the vicinity of the vehicle, a distance between the object and the vehicle, a movement direction of the object, etc. The distance sensor 150 may continuously measure the position of the sensed object to accurately sense change in positional relationship with the vehicle.

The distance sensor 150 may sense the object located in at least one of the front, rear, left and right areas of the vehicle. The distance sensor 150 may be provided at various positions of the vehicle.

Figure 3:
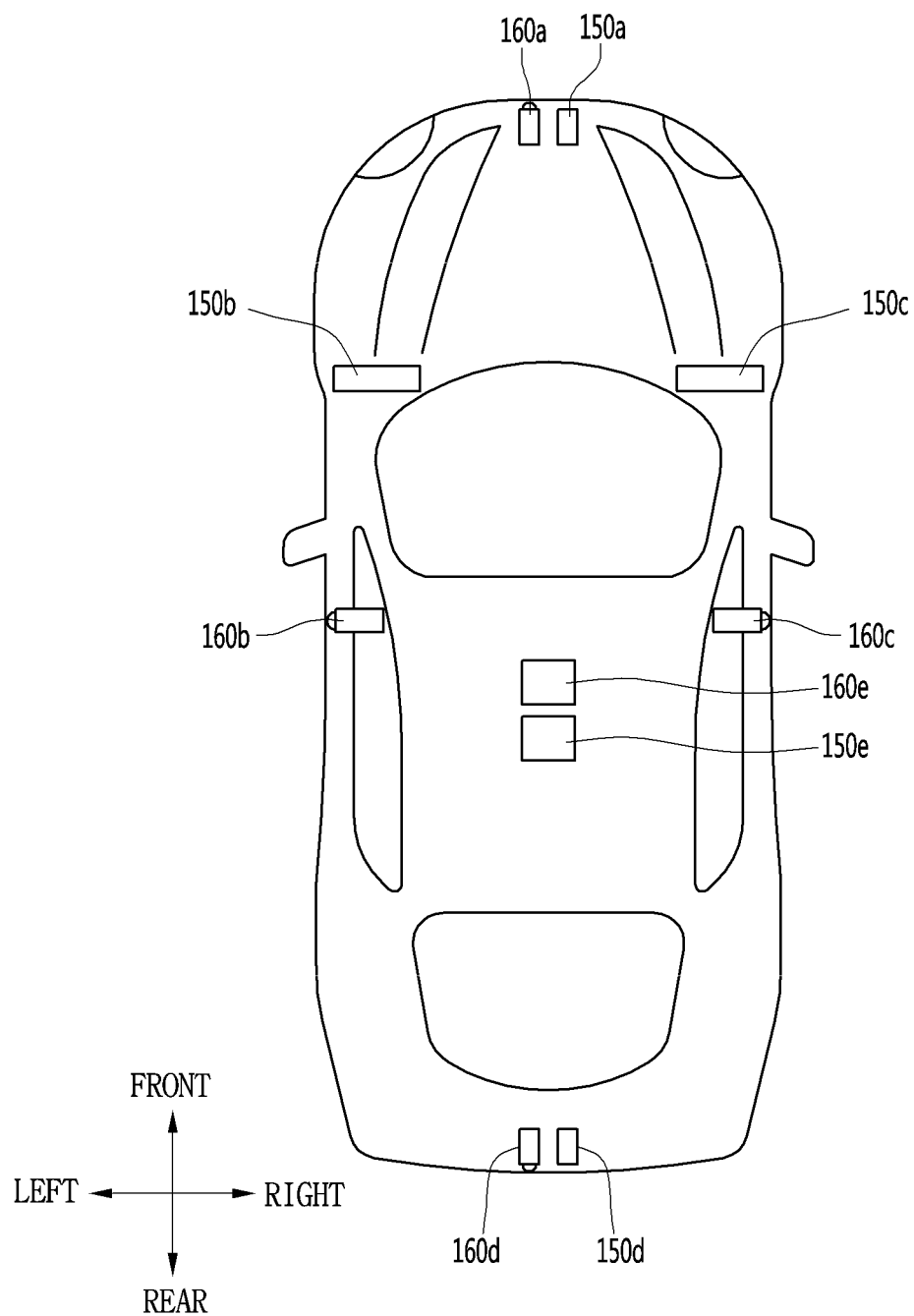
FIG. 3 is a diagram illustrating an example plan view of a vehicle having a display apparatus.

In detail, referring to FIG. 3, the distance sensor 150 may be provided at at least one of the front, rear, left and right sides and ceiling of the vehicle.

The distance sensor 150 may include at least one of various distance measurement sensors such as a Lidar sensor, a laser sensor, an ultrasonic wave sensor and a stereo camera.

For example, the distance sensor 150 is a laser sensor and may accurately measure a positional relationship between the vehicle and the object using a time-of-flight (TOF) and/or a phase-shift method according to a laser signal modulation method.

Information on the object may be acquired by analyzing the image captured by the camera 160 at the processor 170.

In detail, the display apparatus 100 may capture the image of the vicinity of the vehicle using the camera 160, analyze the image of the vicinity of the vehicle using the processor 170, detect the object located in the vicinity of the vehicle, determine the attributes of the object and generate sensor information.

The image information is at least one of the type of the object, traffic signal information indicated by the object, the distance between the object and the vehicle and the position of the object and may be included in the sensor information.

In detail, the processor 170 may detect the object from the captured image via image processing, track the object, measure the distance from the object, and check the object to analyze the object, thereby generating image information.

The camera 160 may be provided at various positions.

In detail, the camera 160 may include an internal camera 160f for capturing an image of the front side of the vehicle within the vehicle and acquiring a front image.

Referring to FIG. 3, a plurality of cameras 160 may be provided at least one of the front, rear, right and left and ceiling of the vehicle.

In detail, the left camera 160b may be provided inside a case surrounding a left side mirror. Alternatively, the left camera 160b may be provided outside the case surrounding the left side mirror. Alternatively, the left camera 160b may be provided in one of a left front door, a left rear door or an outer area of a left fender.

The right camera 160c may be provided inside a case surrounding a right side mirror. Alternatively, the right camera 160c may be provided outside the case surrounding the right side mirror. Alternatively, the right camera 160c may be provided in one of a right front door, a right rear door or an outer area of a right fender.

In addition, the rear camera 160d may be provided in the vicinity of a rear license plate or a trunk switch. The front camera 160a may be provided in the vicinity of an emblem or a radiator grill.

The processor 170 may synthesize images captured in all directions and provide an around view image viewed from the top of the vehicle. Upon generating the around view image, boundary portions between the image regions occur. Such boundary portions may be subjected to image blending for natural display.

In addition, the ceiling camera 160e may be provided on the ceiling of the vehicle to capture the image of the vehicle in all directions.

The camera 160 may directly include an image sensor and an image processing module. The camera 160 may process a still image or a moving image obtained by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, in some implementations, the camera 160 may be a stereo camera for capturing an image and, at the same time, measuring a distance from an object.

The sensor unit 155 may be a stereo camera including the distance sensor 150 and the camera 160. That is, the stereo camera may acquire an image and, at the same time, sense a positional relationship with the object.

Hereinafter, referring to FIGS. 4 to 6, the stereo camera and a method of detecting image information by the processor 170 using the stereo camera will be described in greater detail.

Figure 4:
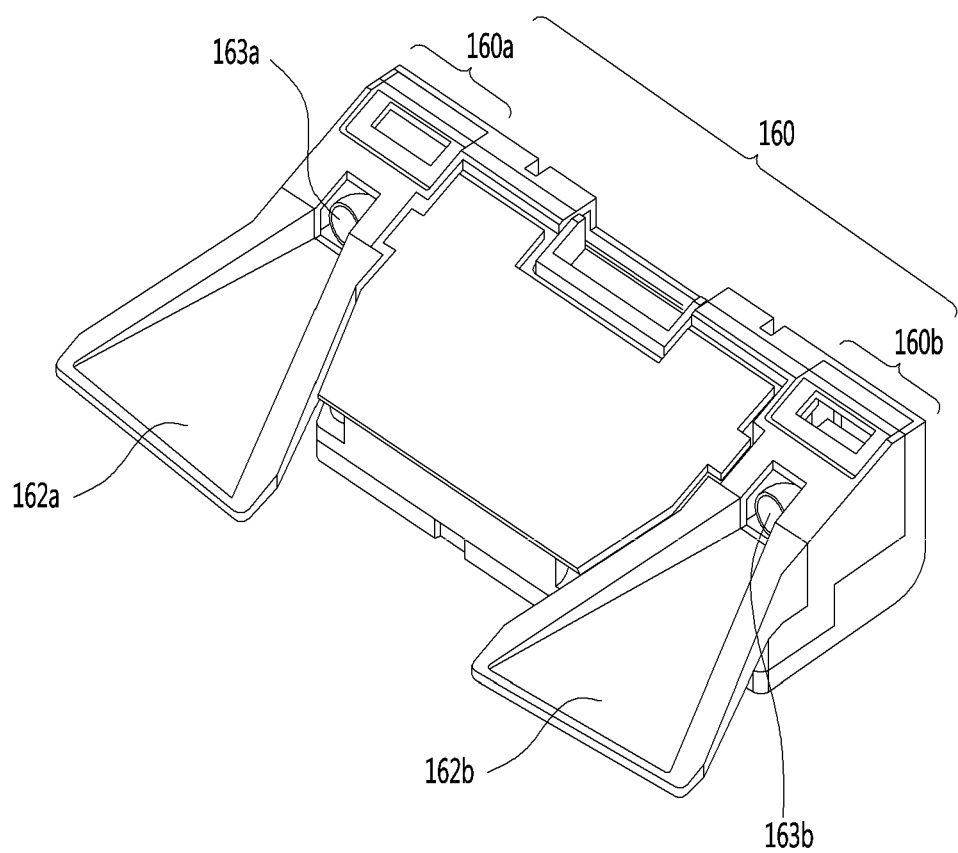
FIG. 4 is a diagram illustrating an example of a camera.

First, referring to FIG. 4, the stereo camera 160 may include a first camera 160a including a first lens 163a and a second camera 160b including a second lens 163b.

The display apparatus 100 may further include first and second light shield units 162a and 162b for shielding light incident upon the first and second lenses 163a and 163b.

The display apparatus 100 may acquire stereo images of the vicinity of the vehicle from the first and second cameras 160a and 160b, detect disparity based on the stereo images, detect an object from at least one stereo image, and continuously track movement of the object after object detection.

Figure 5:
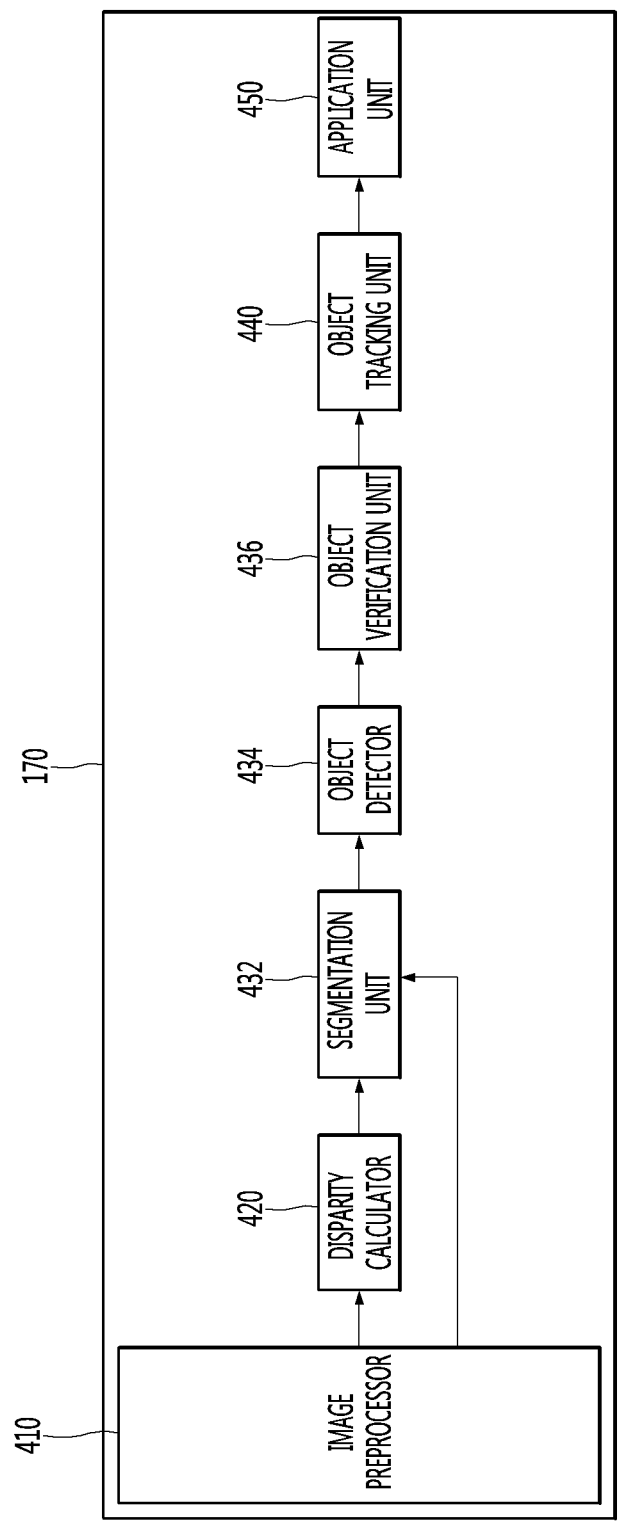
FIGS. 5 and 6 are diagrams illustrating an example of generating image information from an image of a camera.

Referring to FIG. 5, as one example of the block diagram of the internal configuration of the processor 170, the processor 170 of the display apparatus 100 may include an image preprocessor 410, a disparity calculator 420, an object detector 434, an object tracking unit 440 and an application unit 450. Although an image is processed in order of the image preprocessor 410, the disparity calculator 420, the object detector 434, the object tracking unit 440 and the application unit 450 in FIG. 5 and the following description, the present disclosure is not limited thereto.

The image preprocessor 410 may receive an image from the camera 160 and perform preprocessing.

In detail, the image preprocessor 410 may perform noise reduction, rectification, calibration, color enhancement, color space conversion (CSC), interpolation, camera gain control, etc. of the image. An image having definition higher than that of the stereo image captured by the camera 160 may be acquired.

The disparity calculator 420 may receive the images processed by the image preprocessor 410, perform stereo matching of the received images, and acquire a disparity map according to stereo matching. That is, disparity information of the stereo image of the front side of the vehicle may be acquired.

At this time, stereo matching may be performed in units of pixels of the stereo images or predetermined block units. The disparity map may refer to a map indicating the numerical value of binocular parallax information of the stereo images, that is, the left and right images.

The segmentation unit 432 may perform segmentation and clustering with respect to at least one image based on the disparity information from the disparity calculator 420.

In detail, the segmentation unit 432 may segment at least one stereo image into a background and a foreground based on the disparity information.

For example, an area in which the disparity information is less than or equal to a predetermined value within the disparity map may be calculated as the background and excluded. Therefore, the foreground may be segmented. As another example, an area in which the disparity information is greater than or equal to a predetermined value within the disparity map may be calculated as the foreground and extracted. Therefore, the foreground may be segmented.

The background and the foreground may be segmented based on the disparity information extracted based on the stereo images to reduce signal processing speed, the amount of processed signals, etc. upon object detection.

Next, the object detector 434 may detect the object based on the image segment from the segmentation unit 432.

That is, the object detector 434 may detect the object from at least one image based on the disparity information.

In detail, the object detector 434 may detect the object from at least one image.

For example, the object may be detected from the foreground segmented by image segmentation.

Next, the object verification unit 436 may classify and verify the segmented object.

To this end, the object verification unit 436 may use an identification method using a neural network, a support vector machine (SVM) method, an identification method by AdaBoost using Haar-like features or a histograms of oriented gradients (HOG) method.

The object verification unit 436 may compare the objects stored in the memory 140 and the detected object and verify the object.

For example, the object verification unit 436 may verify a peripheral vehicle, a lane, a road surface, a traffic sign, a danger zone, a tunnel, etc. located in the vicinity of the vehicle.

The object tracking unit 440 may track the verified object. For example, the objects in the sequentially acquired stereo images may be verified, motion or motion vectors of the verified objects may be calculated and motion of the objects may be tracked based on the calculated motion or motion vectors. A peripheral vehicle, a lane, a road surface, a traffic sign, a danger zone, a tunnel, etc. located in the vicinity of the vehicle may be tracked.

Next, the application unit 450 may calculate a degree of risk, etc. based on various objects located in the vicinity of the vehicle, for example, another vehicle, a lane, a road surface, a traffic sign, etc. In addition, possibility of collision with a preceding vehicle, whether a vehicle slips, etc. may be calculated.

The application unit 450 may output a message indicating such information to the user as driver assistance information based on the calculated degree of risk, possibility of collision or slip. Alternatively, a control signal for vehicle attitude control or driving control may be generated as vehicle control information.

The image preprocessor 410, the disparity calculator 420, the segmentation unit 432, the object detector 434, the object verification unit 436, the object tracking unit 440 and the application unit 450 may be included in the image processor (see FIG. 31) of the processor 170.

In some implementations, the processor 170 may include only some of the image preprocessor 410, the disparity calculator 420, the segmentation unit 432, the object detector 434, the object verification unit 436, the object tracking unit 440 and the application unit 450. If the camera 160 includes a mono camera 160 or an around view camera 160, the disparity calculator 420 may be excluded. In some implementations, the segmentation unit 432 may be excluded.

Figure 6:
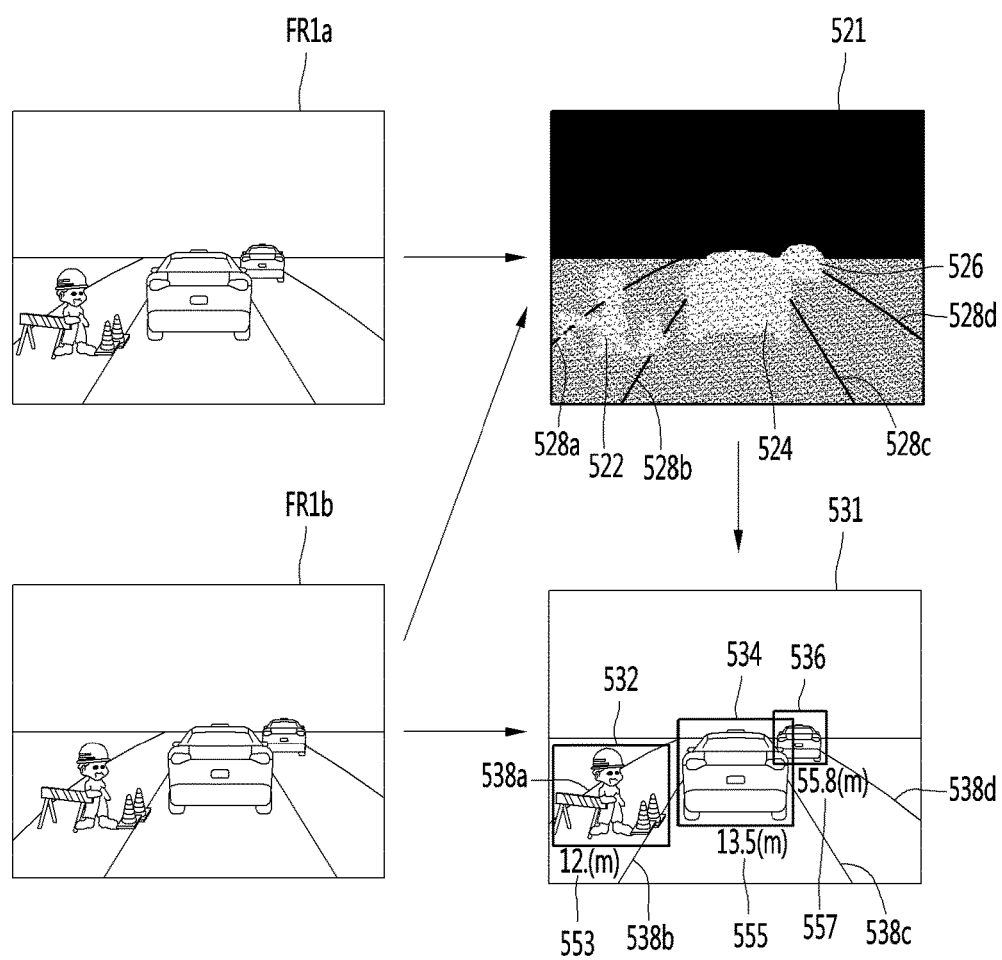
Figure 7:
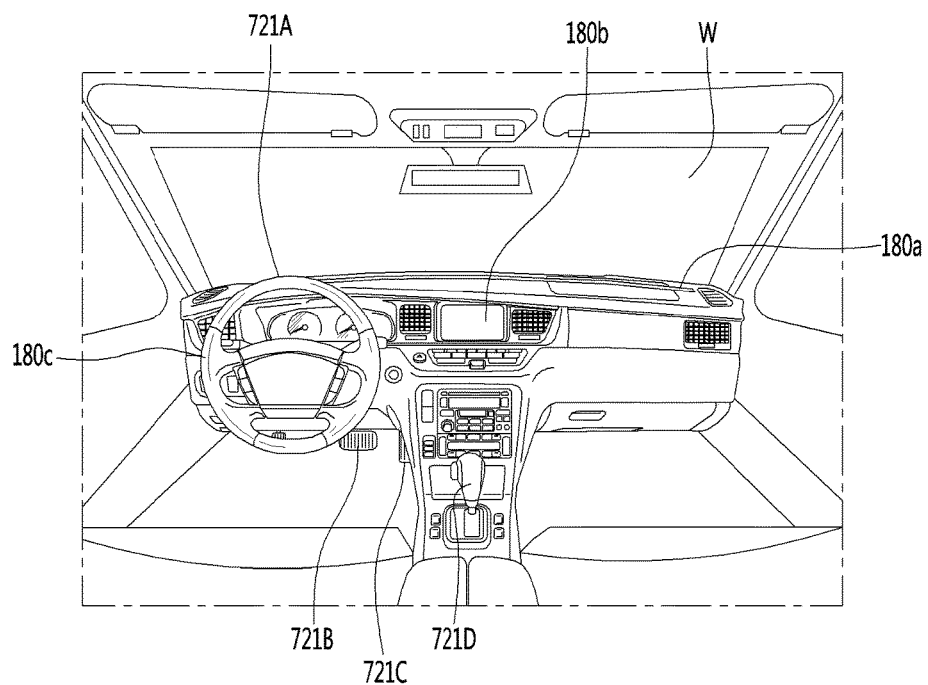
FIG. 7 is a diagram illustrating an example of the inside of a vehicle having a display apparatus.

Referring to FIG. 6, during a first frame period, the camera 160 may acquire stereo images.

The disparity calculator 420 of the processor 170 receives stereo images FR1a and FR1b processed by the image preprocessor 410, performs stereo matching with respect to the stereo images FR1a and FR1b and acquires a disparity map 520.

The disparity map 520 indicates the levels of binocular parallax between the stereo images FR1a and FR1b. As a disparity level increases, a distance from a vehicle may decrease and, as the disparity level decreases, the distance from the vehicle may increase.

When such a disparity map is displayed, luminance may increase as the disparity level increases and decrease as the disparity level decreases.

In the figure, disparity levels respectively corresponding to first to fourth lanes 528a, 528b, 528c and 528d and disparity levels respectively corresponding to a construction area 522, a first preceding vehicle 524 and a second preceding vehicle 526 are included in the disparity map 520.

The segmentation unit 432, the object detector 434 and the object verification unit 436 may perform segmentation, object detection and object verification with respect to at least one of the stereo images FR1a and FR1b based on the disparity map 520.

In the figure, object detection and verification are performed with respect to the second stereo image FR1b using the disparity map 520.

That is, object detection and verification are performed with respect to the first to fourth lanes 538a, 538b, 538c and 538d, the construction area 532, the first preceding vehicle 534 and the second preceding vehicle 536 of the image 530.

With image processing, the display apparatus 100 may acquire various surrounding information of the vehicle, such as peripheral objects or the positions of the peripheral objects, using the sensor unit 155, as sensor information.

Next, the display apparatus 100 may further include a display unit 180 for displaying a graphic image of the driver assistance function.

Specifically, the display unit 180 may display an indicator indicating steering control information.

The steering control information may include information such as a target steering direction to follow a predicted movement route, a current steering state, a steering operation direction, a recommended steering operation speed, and the like. The predicted movement route may be calculated based on the vehicle periphery information. The current steering state represents a direction in which a vehicle wheel is steered according to the turning of a steering input unit (e.g., a steering wheel). For example, the current steering state refers to a direction in which a vehicle wheel is turned with respect to a vehicle heading direction.

When the current steering state represents a state where a steering input unit is turned (for example, steering turning direction), the target steering direction may represent a target steering turning direction. In this case, indicating the target steering turning direction may be difficult when the target steering turning direction involves rotating the steering input unit once or more full rotations. This may be especially difficult when the rate at which the steering input unit is turned is not equal to the rate at which the vehicle wheel is steered.

Therefore, in the following description, an indicator is displayed with respect to a vehicle wheel direction. For example, an indicator may be displayed on a steering input unit (e.g., on the handle of a steering wheel) to indicate a target turning angle of the vehicle wheel to account for full rotations of the steering wheel.

The indicator indicating information about steering control may include a first indicator indicating a target steering direction, a third indicator indicating a current steering state, and a second indicator displayed between the first indicator and the third indicator.

For example, the display unit 180 displays the target steering direction when steering control is necessary and displays a recommended operation speed for a steering operation for changing the current steering state to the target steering direction, thus inducing the driver to perform a steering operation at an appropriate operation steep until the current steering state reaches the optimal steering direction. Therefore, the vehicle can stably move along the predicted movement route through appropriate steering control corresponding to a situation.

The display unit may include a plurality of displays.

In detail, the display unit may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display 180b separately provided inside the vehicle to display an image of the driver assistance function.

In detail, the second display 180b may be a display of a vehicle navigation apparatus or a cluster located at an internal front side of the vehicle.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display.

The second display 180b may be combined with a gesture input unit to achieve a touchscreen.

Also, the display unit 180 may include a third display unit 180c directly disposed on a steering input unit 721A to display an indicator.

Figure 8:
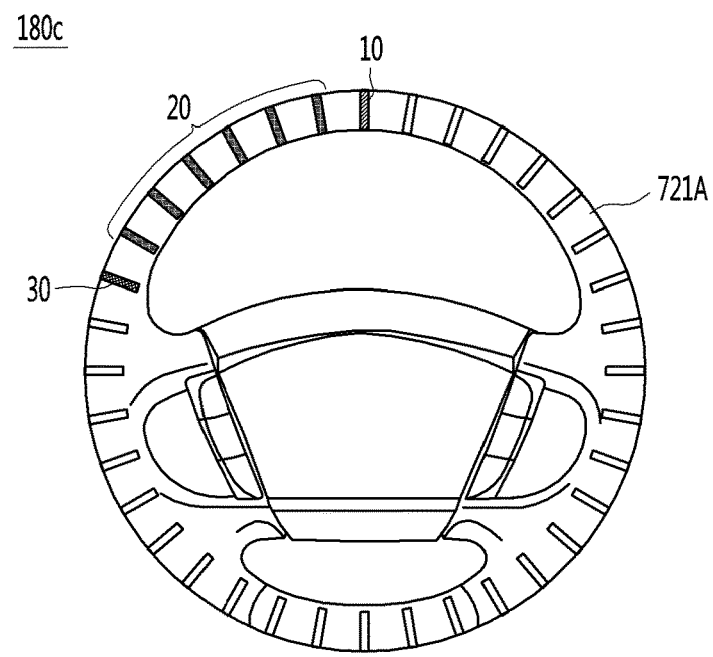
FIG. 8 is a diagram illustrating an example of a third display unit according to an implementation.

Specifically, referring to FIG. 8, the third display unit 180c according to an implementation may include a plurality of display units arranged at equal intervals along the outer circumference of the steering input unit 721A. Each of the display units may be a light capable of being turned on/off. In this case, the third display unit 180c may be a lighting apparatus including a plurality of light emitting diodes (LEDs).

The display unit performs display in different manners according to vehicle state information by changing at least one of brightness, luminance, saturation, hue, shape, size, and pattern, thus indicating a steering operation sensitivity, the recommended operation speed, the operation direction, or the like.

For example, when a speed of the vehicle exceeds a predetermined speed, the display unit may display, through a specific color, a warning indicating that the steering sensitivity that is a rate at which the vehicle is turned becomes sensitive upon turning of the steering.

Specifically, the display unit may inform the driver of a state where the steering sensitivity is gradually becoming sensitive by raising the saturation of the display unit as the speed increases.

The third display unit 180c directly displays information about steering control on the steering input unit 721A, allowing the driver to intuitively understand the steering control information.

Referring back to the description for provision of the steering control information, the third display unit 180c turns on a display unit disposed at a position corresponding to the current steering state to display the first indicator 10, turns on a display unit corresponding to the target steering direction to display the third indicator 30, and turns on display units disposed between the first indicator 10 and the third indicator 30 to display the second indicator 20. In this case, the display units corresponding to the first to third indicators 10 to 30 can be distinguished from one another by displaying different colors.

Also, at least some of the display units of the second indicator 20 are turned off sequentially according to the elapse of time to indicate the recommended operation steep for steering control. Specifically, the recommended operation speed can be indicated in such a way that display units on the side of the first indicator 10 are sequentially turned off and a display unit on the side of the third indicator 30 is finally turned off according to the elapse of time.

Therefore, the steering is controlled such that a display unit for displaying the first indicator 10 is changed according to the display units which are turned off, to enable the control of the steering to be performed at the recommended operation speed, thus enabling the predicted movement route to be followed.

In particular, the display units of the third display unit 180c may display the first to third indicators 10, 20, and 30 continuously while the display units which are turned on are being changed according to steering control.

First, there will be described a case where a rate at which a steering input unit is turned versus a rate at which a wheel of the vehicle is steered is 1:1.

When a current steering state moves by an angle by which the vehicle wheel is steered according to turning of the steering, in order to display the first indicator 10, a display unit disposed in the steering direction SC is continuously turned on as the vehicle wheel is steered, thus displaying the first indicator 10.

The target steering direction corresponds to a direction that is rotated from a fixed absolute position, such as the steering center direction CL, by a predetermined angle regardless of rotation of the steering. As such, even if the steering input unit (e.g., steering wheel) is rotated, the absolute position of the target steering direction may remain fixed, thus providing a stationary target for the driver to achieve while steering. To provide such a fixed target, a display unit for displaying the third indicator 30 is changed to correspond with, and to compensate for, rotation of the steering input unit. By changing the display unit that displays the third indicator 30, the absolute position of the third indicator remains fixed despite rotation of the steering input unit.

That is, regardless of the rotation of the steering, the display unit for displaying the third indicator 30 is a display unit which indicates a direction which is rotated by the predetermined angle from the steering center direction CL. Therefore, as the steering is rotated, the display unit for displaying the third indicator 30 may be shifted in the opposite direction to the rotation of the steering, which may be defined as "shift back".

For example, when the steering is rotated one click (an interval between display units) to the left, the display unit for displaying the third indicator 30 may be a display unit disposed at a position shifted one click to the right from the display unit which displays the third indicator 30 previously.

In this case, the steering center direction CL represents a steering direction in which a vehicle heading direction is parallel to a direction of the vehicle's wheels.

Similarly, the second indicator 20 is displayed by display units for displaying the direction which is rotated by the predetermined angle from the steering center direction CL regardless of the rotation of the steering. Therefore, when the steering direction SC moves according to steering control, the display units for displaying the second indicator 20 may be shifted back.

For example, when the steering is rotated one click to the left, the display units for displaying the second indicator 20 may be display units disposed at positions respectively shifted one click to the right from the display units before the rotation.

When the rate at which the steering is turned is not equal to the rate at which the vehicle wheel is steered, the display unit for displaying the first indicator 10 may be changed according to steering control. Specifically, since the current steering state indicated by the first indicator 10 represents a vehicle wheel direction, the rate at which the steering is turned is different from the rate at which the vehicle wheel is steered, a display unit which indicates the direction in which the vehicle wheel is steered according to the steering control may display the first indicator 10.

According to another implementation, the third display unit 180c may continuously display the first to third indicators 10 to 30.

Figure 9:
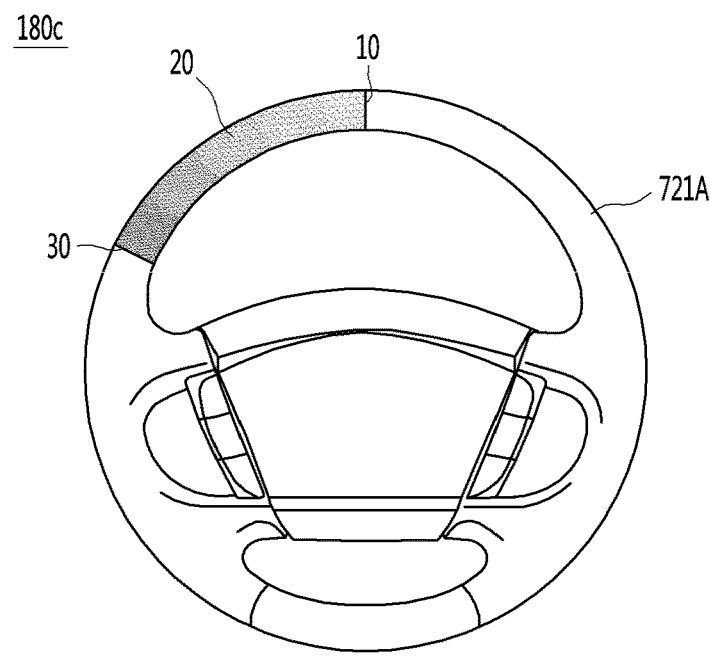
FIG. 9 is a diagram illustrating an example of a third display unit according to another implementation.

Specifically, referring to FIG. 9, the third display unit 180c may a display which displays a graphic image continuously along the outer circumference of the steering. Specifically, the third display unit 180c displays the first indicator 10 so as to indicate the current steering state, displays the third indicator 30 so as to indicate the target steering direction, and displays the second indicator 20 between the first indicator 10 and the third indicator 30.

In this case, the second indicator 20 may indicate steering operation sensitivity, the recommended operation speed, an operation direction, or the like, by changing at least one of brightness, luminance, saturation, hue, shape, size, and pattern in different manners.

For example, as illustrated in FIG. 9, the second indicator 20 may indicate the operation direction, the operation speed, or the like, in such a way to be faded out gradually from the side of the third indicator 30 to the side of the first indicator 10.

In addition, the second indicator 20 may indicate the recommended operation speed in such a way to be shaded gradually from the side of the third indicator 30 to the side of the first indicator 10, with the shading being changed gradually according to the elapse of time.

In summary, the third display unit 180c is disposed on the steering to directly display an indicator for each direction for steering, allowing the driver to intuitively understand the steering control information.

On the other hand, the first display unit 180a or the second display unit 180b displays a virtual steering image, which is similar to the steering, by using a graphic image, and displays an indicator on the virtual steering image, thus providing the steering control information to the driver.

It is noted that the present disclosure is not limited to a configuration to display the indicator on the virtual steering image, and it is possible to display the indicator based on a graphic image, such as a bar-shaped image or a semicircle-shaped image.

According to an implementation, it is preferable that the steering control information is displayed by using the virtual steering image in order for the driver to intuitively understand the steering control information. In the following description, a method of displaying an indicator based on a steering image will be described.

On the other hand, the first display unit 180a displays a recommended movement route by using a graphic image and displays steering control information for following the recommended movement route by using a graphic image on a windshield, allowing the driver to be provided with the steering control information while maintaining a front view.

Next, the audio output unit 185 may audibly output a message for explaining the function of the display apparatus 100 and checking whether the driver assistance function is performed. That is, the display apparatus 100 may provide explanation of the function of the display apparatus 100 via visual display of the display unit 180 and audio output of the audio output unit 185.

Next, the haptic output unit may output an alarm for the driver assistance function in a haptic manner. For example, the display apparatus 100 may output vibration to the user when a warning is included in at least one of navigation information, traffic information, communication information, vehicle state information, advanced driver assistance system (ADAS) function and other driver convenience information.

The haptic output unit may provide directional vibration. For example, the haptic output unit may be provided in a steering apparatus for controlling steering to output vibration. Left or right vibration may be output according to the left and right sides of the steering apparatus to enable directional haptic output.

In addition, the power supply 190 may receive power and supply power necessary for operation of the components under control of the processor 170.

Lastly, the display apparatus 100 may include the processor 170 for controlling overall operation of the units of the display apparatus 100.

In addition, the processor 170 may control at least some of the components described with reference to FIG. 3 in order to execute the application program. Further, the processor 170 may operate by combining at least two of the components included in the display apparatus 100*es*, in order to execute the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors 170, and electric units for the implementation of other functions.

The processor 170 may be controlled by the controller or may control various functions of the vehicle through the controller.

The processor 170 may control overall operation of the display apparatus 100 in addition to operation related to the application programs stored in the memory 140. The processor 170 may process signals, data, information, etc. via the above-described components or execute the application programs stored in the memory 140 to provide appropriate information or functions to the user.

A method of assisting steering control in the processor 170 according to an implementation will be described below in detail with reference to FIGS. 10 to 15.

Figure 10:
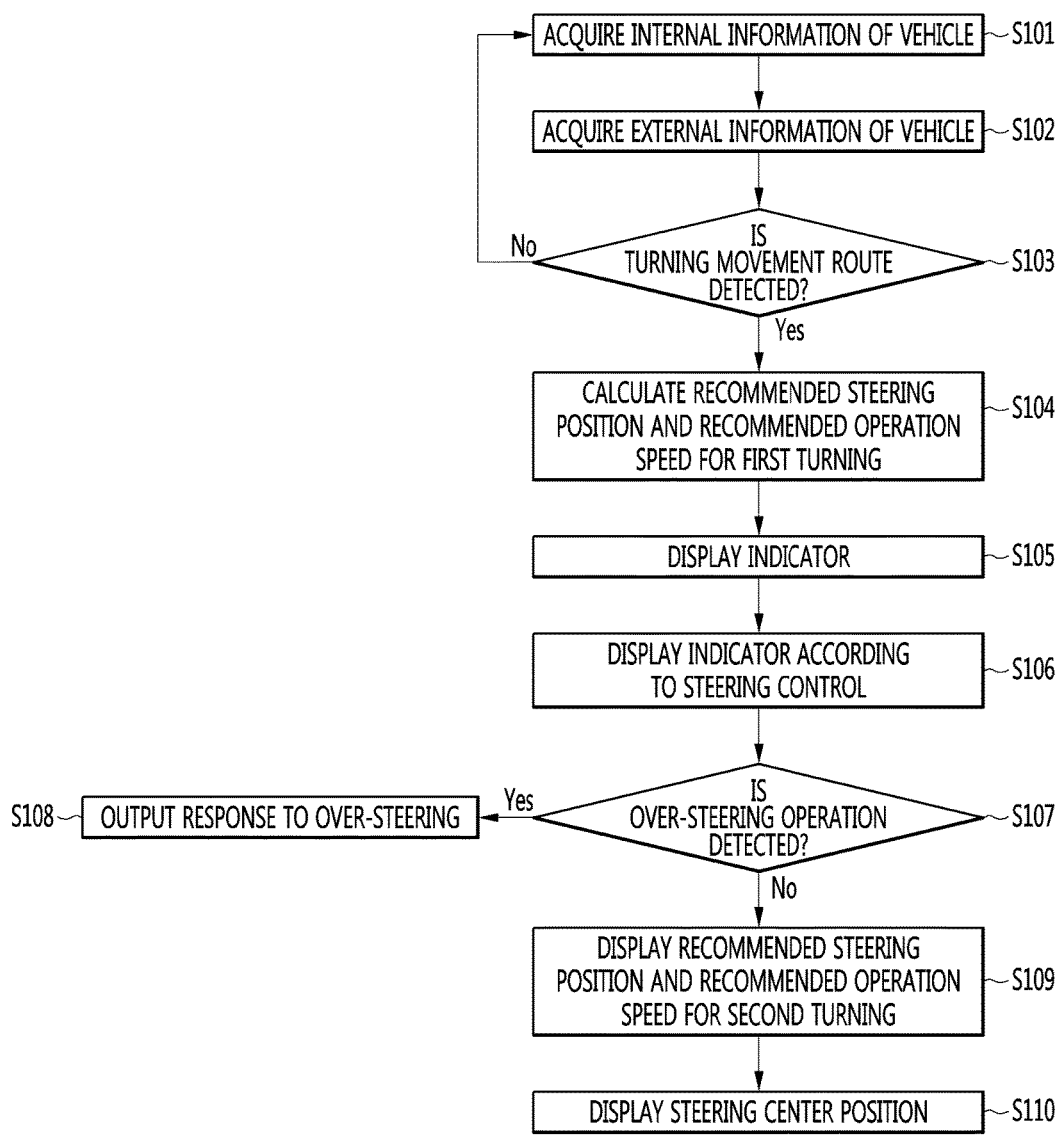
FIG. 10 is a flowchart illustrating an example of providing steering control information in a display apparatus.

First, referring to FIG. 10, the processor 170 may acquire vehicle state information (S101).

Specifically, the processor 170 may acquire the vehicle state information through the interface unit 130 and the communication unit 120.

Such vehicle state information may include vehicle steering information, position information, acceleration information, acceleration speed information, heading sensor information, yaw sensor information, vehicle wheel sensor information, and the like, and may be used to generate steering control information.

Also, the processor 170 may acquire vehicle periphery information (S102).

Specifically, the processor 170 may acquire the vehicle periphery information through at least one of the sensor unit 155, the interface unit 130, and the communication unit 120.

Such vehicle periphery information may include navigation information, traffic information, driving information of other vehicles, and the like, and may be used to generate the steering control information.

Thereafter, the processor 170 may detect a situation where turning of the heading direction of the vehicle is necessary from the vehicle periphery information. In addition, the processor 170 may generate, based on the vehicle periphery information, a predicted movement route including at least one turning operation (S103).

Specifically, the processor 170 may detect detection of an obstacle having a possibility of collision, curve driving, lane change, or the like, as a situation in which turning is necessary.

When the situation in which turning is necessary is detected, the processor 170 may generate a predicted movement route including at least one turning.

Figure 11:
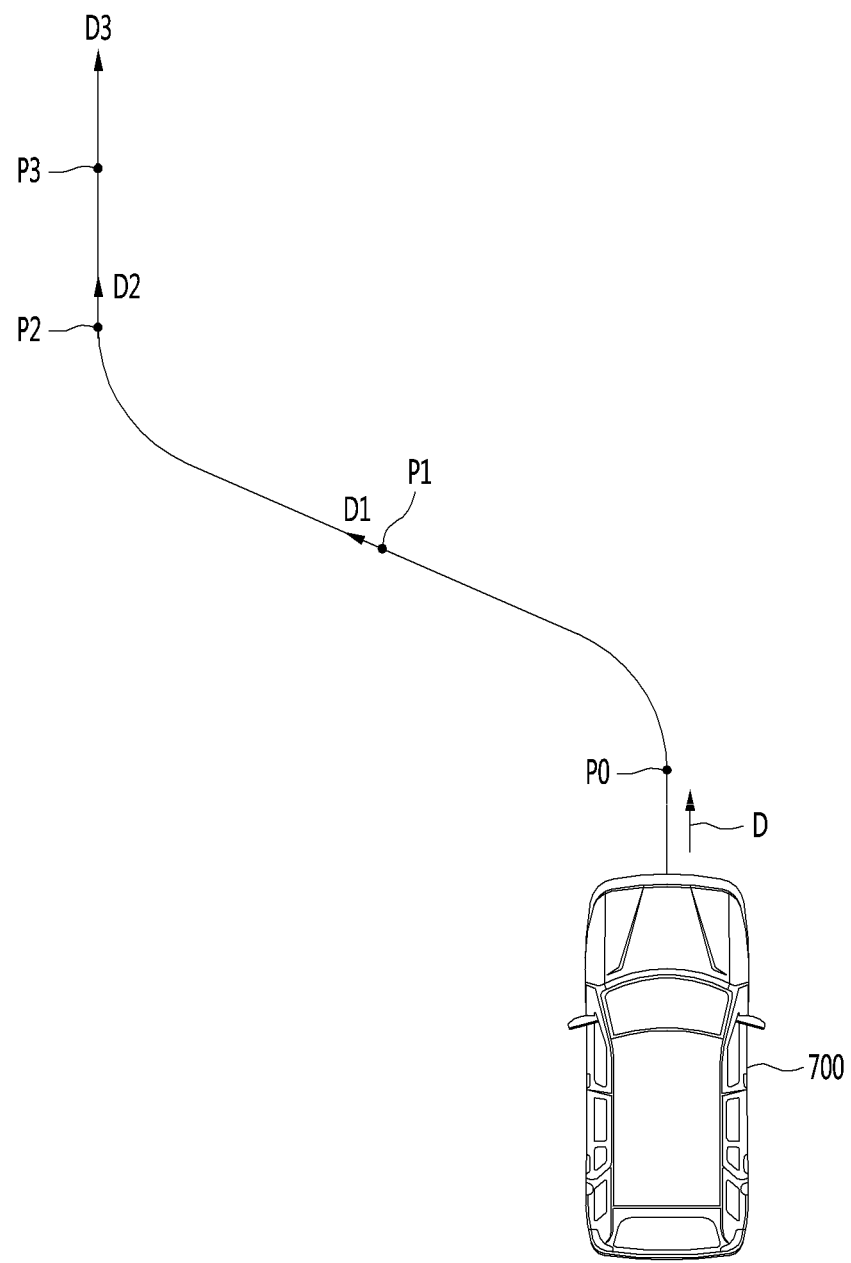
FIG. 11 is a diagram illustrating an example of a turning movement route designed based on vehicle periphery information.

Specifically, referring to FIG. 11, a predicted movement route may be generated, which includes a first turning by which the heading direction of the vehicle is changed (e.g., to D1) and a second turning having a different turning direction from a first turning direction D1.

When the predicted movement route is generated, the processor 170 may calculate a target steering direction and a recommended operation speed for following the predicted movement route (S104).

The target steering direction may be the first turning direction D1 that is the heading direction of the vehicle at a point P1 (hereinafter, referred to as a "first point") at which the heading direction is turned maximally in a first turning movement route (e.g., the portion of the route from P0 to P1). That is, referring to FIG. 11, the first turning direction D1 that is the heading direction of the vehicle at the first point P1, may be determined as the target steering direction.

When a vehicle wheel direction is turned in the first turning direction D1 after the first turning direction D1 of the vehicle is determined as the target steering direction, the vehicle cannot follow the predicted movement route.

Figure 12:
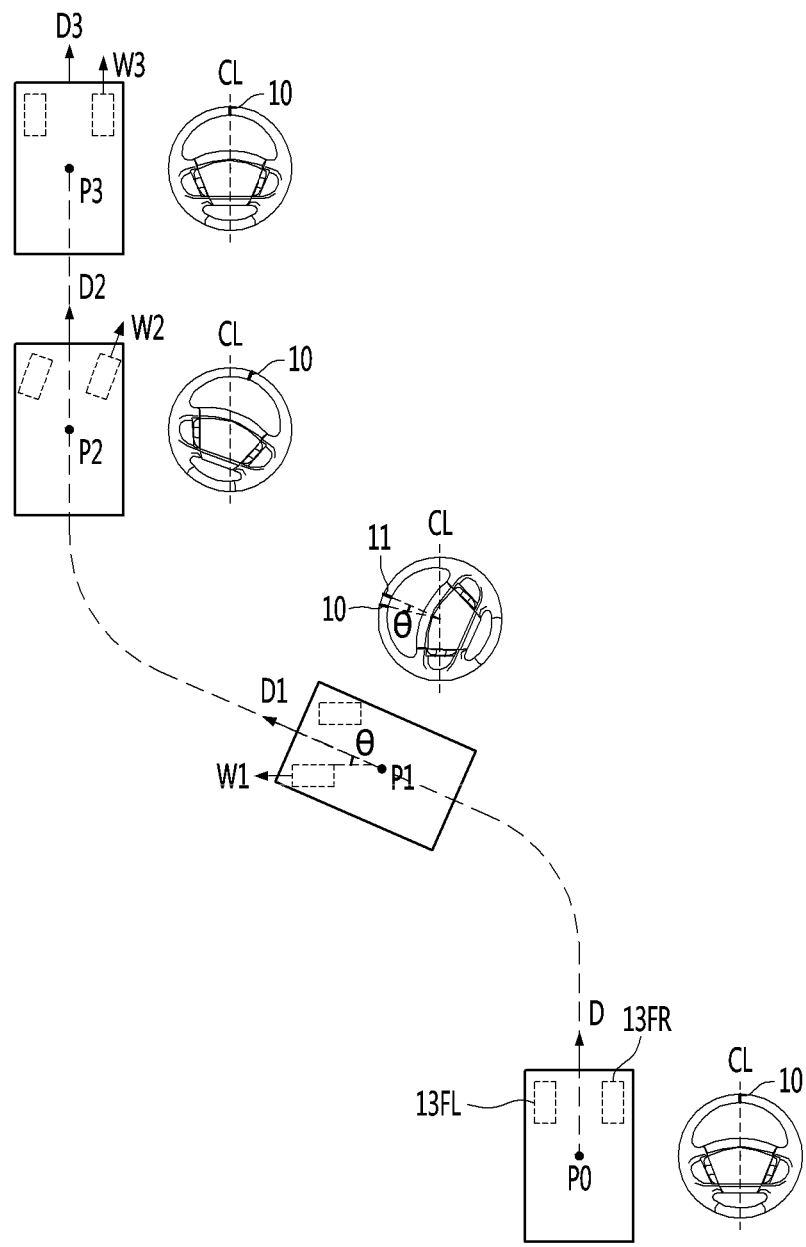
FIG. 12 is a diagram illustrating an example of a vehicle moving along the turning movement route of FIG. 11.

Specifically, it can be seen from FIG. 12 that, when the vehicle moves along the predicted movement route, the vehicle wheel direction W1 at the first position P1 is a direction that is further rotated in the direction of turning from the first turning direction D1. Therefore, it is preferable that the target steering direction is the vehicle wheel direction that is further rotated from the first turning direction D1 by a predetermined angle.

On the other hand, when the driver performs a steering operation from the current steering state to the target steering direction at a lower speed or a higher speed, the vehicle cannot follow the predicted movement route, thus resulting in a necessity to further calculate and display a steering operation speed.

The processor 170 may calculate the steering operation direction or the steering operation speed based on the vehicle state information, the vehicle periphery information, or the predicted movement route.

When calculating the target steering direction, the current steering state, and the recommended operation speed, the processor 170 may perform control such that the display unit 180 displays them by using the indicators (S105).

Specifically, the processor 170 may perform control such that the first display unit 180*a* or/and the second display unit 180*b* displays an indicator on the virtual steering image.

Also, the processor 170 may perform control such that the third display unit 180*c* displays an indicator on an actual steering.

The following description is given under the assumption that control is performed such that the third display unit 180*c* displays an indicator on an actual steering. This description will be understood as the first display unit 180*a* and the second display unit 180*b* display indicators by using the virtual steering image.

When it is necessary to turn the steering at least once in order for movement from the current steering state to the target steering direction, the processor 170 may perform control such that at least one of the first to third indicators 10, 20, and 30 displays the above-described state.

Figure 13A:
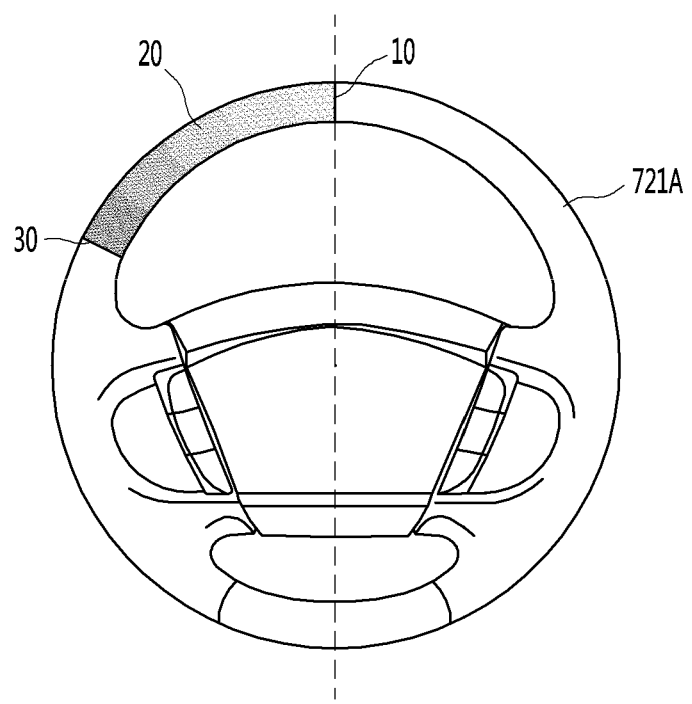
FIGS. 13A and 13B are diagrams illustrating examples of steering control information.

Referring to FIG. 13A, when to rotate the steering once or more times is unnecessary in order for movement from the current steering state to the target steering direction, the first indicator 10 is displayed to indicate the current steering state, the third indicator 30 is displayed to indicate the target steering direction, and the second indicator 20 is displayed in an outer circumference between the first indicator 10 and the third indicator 30.

The driver controls the steering such that the first indicator 10 is moved to the third indicator 30 according to the indication of the second indicator 20, thus enabling the driver to drive the vehicle stably along a turning movement route.

Figure 13B:
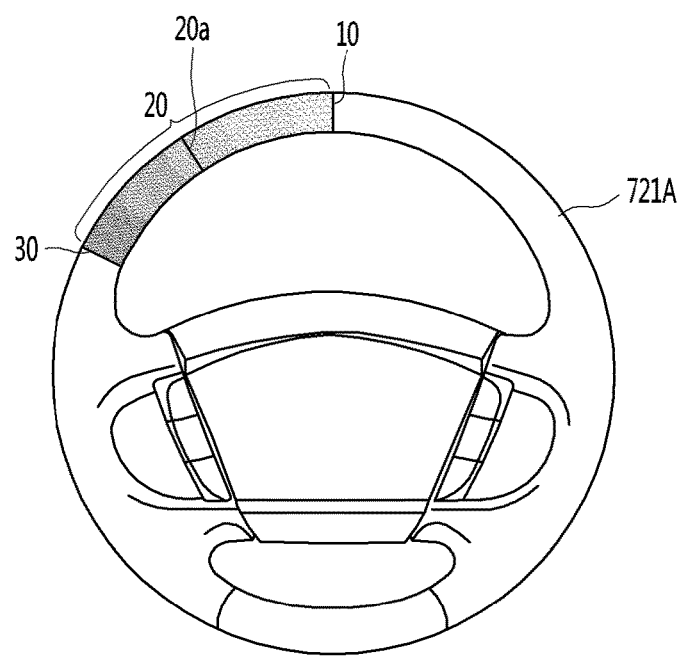

Referring to FIG. 13B, when it is necessary to rotate the steering to the target steering direction once or more times, the second indicator 20 displays this situation through a rotation indicator 20a, thus informing the driver of the situation. In this case, as the steering is rotated, the first indicator 10 is slowly moved, and when the first indicator 10 is rotated once, the first indicator 10 may reach the position of the rotation indicator 20a.

The processor 170 may display the recommended operation speed in a way that the second indicator 20 is gradually shaded from the side of the third indicator 30 to the side of the first indicator 10, with the shading being changed gradually according to the elapse of time.

Next, the processor 170 may change the display of the indicator as the steering is controlled (S106).

The display units of the third display unit 180c may display the first to the third indicators 10, 20 and 30 continuously, while the display units which are turned on are being changed according to steering control.

Specifically, a display position of the third indicator 30 is determined according to a relationship with the steering center line CL regardless of steering control. Therefore, when the positions of the display units are changed according to steering control, a display unit for displaying the third indicator 30 is also changed.

Figure 14A:
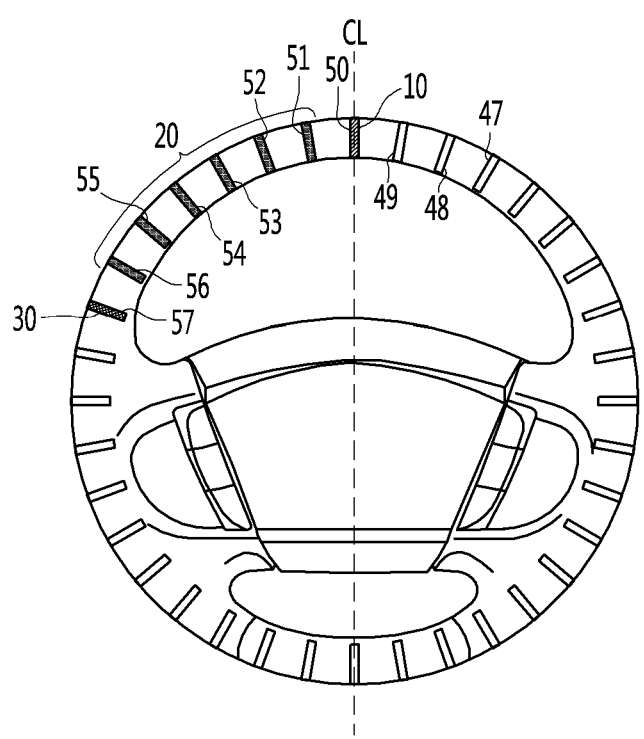
FIGS. 14A to 14F are diagrams illustrating examples in which a third display unit displays steering control information at different positions of a vehicle moving along the turning movement route of FIG. 12, according to an implementation.

For example, referring to FIG. 14A, the display unit for displaying the third indicator 30 is a seventh display unit 57, which is located seventh from the left side of the center line CL.

Figure 14B:
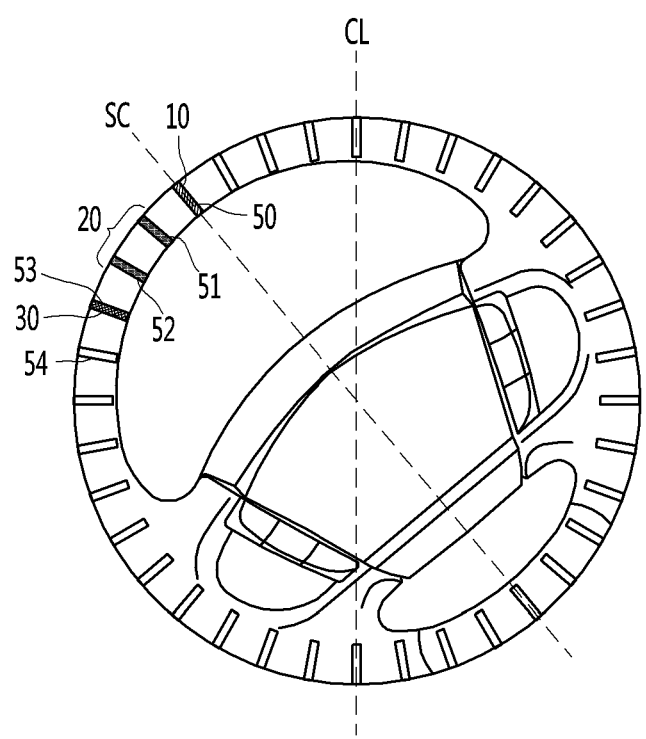

Referring to FIG. 14B, when the steering is rotated four clicks to the left, the display units are shifted. The display unit for displaying third indicator 30 is a third display unit 53 located seventh from the center line CL.

That is, when the steering is rotated to the left by an angle corresponding to one click, the display unit for displaying the third indicator 30 is shifted back to a display unit disposed on the right side.

Also, in the case of the first indicator, when a rate at which the steering is turned is not equal to a rate at which the vehicle wheel is steered, the display unit for displaying the first indicator 10 is also changed according to steering control.

Specifically, since the current steering state indicated by the first indicator 10 represents a vehicle direction, a rate of an angle by which the steering is turned is different from a rate of an angle by which the vehicle wheel is steered, a display unit which displays the direction in which the vehicle wheel is steered according to the steering control may display the first indicator 10.

On the other hand, the processor 170 may modify the predicted movement route as the vehicle moves. In this case, the display of the third indicator 30 may be modified such that the vehicle can follow the modified predicted movement route.

Thereafter, the processor 170 may detect whether there is an over-steering operation in which the current steering state passed through the target steering direction (S107).

Specifically, when it is detected from the vehicle state information that the degree of the steering operation represents that the current steering state passed through the target steering direction, the processor 170 may detect this state as the over-steering operation.

When the over-steering operation is detected, the processor 170 may perform control so as to perform at least one corresponding output (S108).

Specifically, when the over-steering operation in which the third indicator 30 passed through the first indicator 10 is detected, the processor 170 may control the display unit 180 such that the second indicator 20 displays an indication that the over-steering operation is made.

Also, when the over-steering operation is detected, the processor 170 may perform control such that a haptic output unit 183 outputs a force that acts against the over-steering operation.

In this case, when a force for performing the steering operation is equal to or larger than a predetermined force after the force acting against the over-steering operation is output, the processor 170 stops haptic output, thus allowing the driver to smoothly perform desired steering control.

Also, when the over-steering operation is detected, the processor 170 may perform control such that the audio output unit 185 outputs a directional alarm alerting the over-steering operation.

When the vehicle arrives at a first turning (D1) movement route (maximum displacement point), the processor 170 may calculate and display a target steering direction and a recommended operation speed for a second turning (D2) movement route (S109).

The point P2 at which the second turning D2 is maximally displaced with respect to the first turning D1 may be a position at which the vehicle starts straight driving.

Specifically, referring to FIG. 12, the maximum displacement point of the second turning D2 may be a second point P2. In this case, the heading direction of the vehicle may be a straight direction D2. It can be seen that the vehicle wheel direction W2 needs to be more turned than the heading direction D2 that is straight, in a direction in which the second turning D2 is performed.

Therefore, according to an implementation, the target steering direction for the second turning D2 may be a direction which is more moved toward the second turning D2 from the steering center direction. For example, when the driver intends to perform lane change and drive on the changed lane, the second turning is needed, and therefore, it is possible to display the target steering direction for the second turning.

In addition, the processor 170 may end display of the steering control information by displaying the first to third indicators 10, 20, and 30 at a steering center position (S110).

A process by which the third display unit 180c provides steering control information in the situation of FIG. 12, according to an implementation will be described below in detail with reference to FIG. 14.

At a start point before a first turning D1 is started, as illustrated in FIG. 14A, a display unit located at a center of the steering is turned on, thus displaying the first indicator 10 indicating a current steering state.

At a first point P1 that is the maximum turning point upon the first turning D1, a display unit located in a steering direction corresponding to a vehicle wheel direction is turned on, thus displaying the third indicator 30 representing a target steering direction.

Also, a display unit located between the first indicator 10 and the third indicator 30 is turned on, thus displaying the second indicator 20 indicating recommended operation direction and speed.

That is, the first to sixth display units 51, 52, 53, 54, 55, and 56 are turned on to display the second indicator 20.

When the steering is controlled, a display unit 54 corresponding to a controlled steering direction is turned on, thus displaying the first indicator 10.

The second indicator 20 may indicate the recommended operation speed in such a way that the display units corresponding to the second indicator 20 are sequentially turned off from the display unit 51 on the side of the first indicator 10 to the display unit 56 on the side of the third indicator 30 according to the elapse of time.

FIG. 14B illustrates a state of the third display unit 180c before the vehicle arrives at the first point P1 after passing through the start point. It can be seen from FIG. 14B that, as time elapses, the first display unit 51 to the fourth display unit 54 are turned off sequentially in the order thereof, and the fifth display unit 55 and the sixth display unit 56 remains turned on, thus displaying the second indicator 20. The current steering state corresponds to the fourth display unit 54 which displays the first indicator 10.

That is, there is illustrated a case where the driver has controlled the steering appropriately such that the second indicator 20, in which the display units thereof are sequentially turned off, follows the display unit of the first indicator 10 which is turned off well.

Figure 14C:
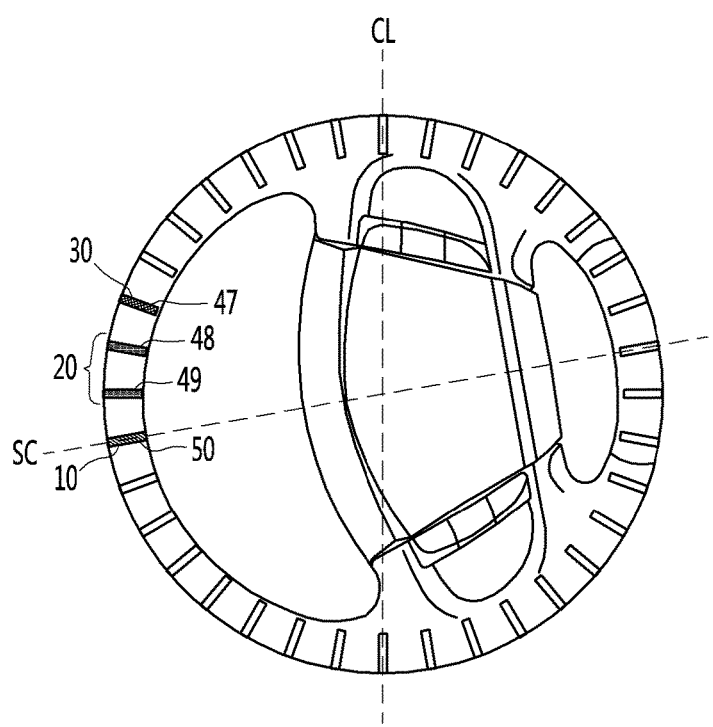

When the over-steering operation is made, as illustrated in FIG. 14C, a display unit disposed at a position which passed through the target steering direction is turned on to display the first indicator 10 and the second indicator 20 is displayed between the third indicator 30 and the first indicator 10, thus displaying an indication that the over-steering operation is made. In this case, the second indicator 20 may be displayed with a color having a high saturation (for example, red) in order to indicate a warning.

Figure 14D:
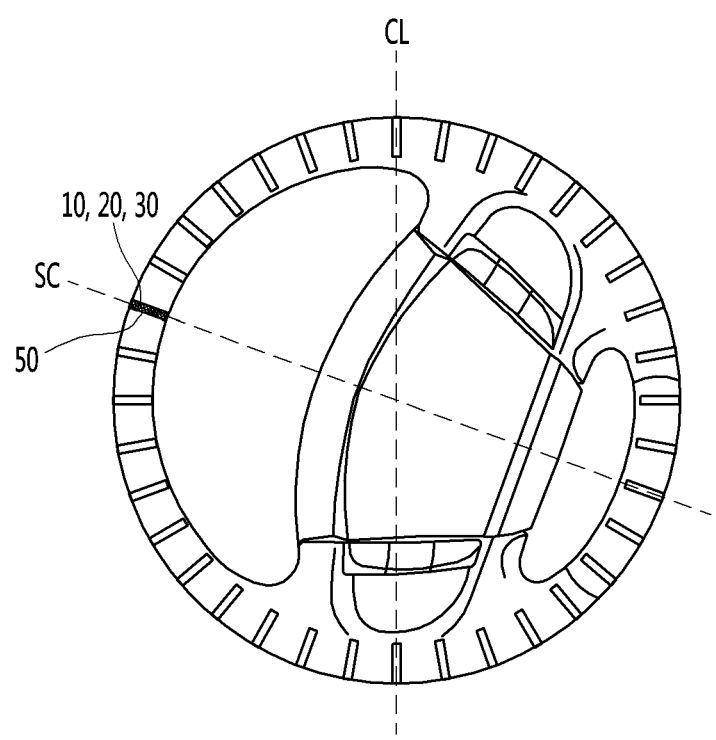

When the driver appropriately controls the steering until the first point P1 and the target steering direction is then reached, as illustrated in FIG. 14D, the first to third indicators 10 to 30 may be displayed to be superimposed on a display unit located in the target steering direction.

Figure 14E:
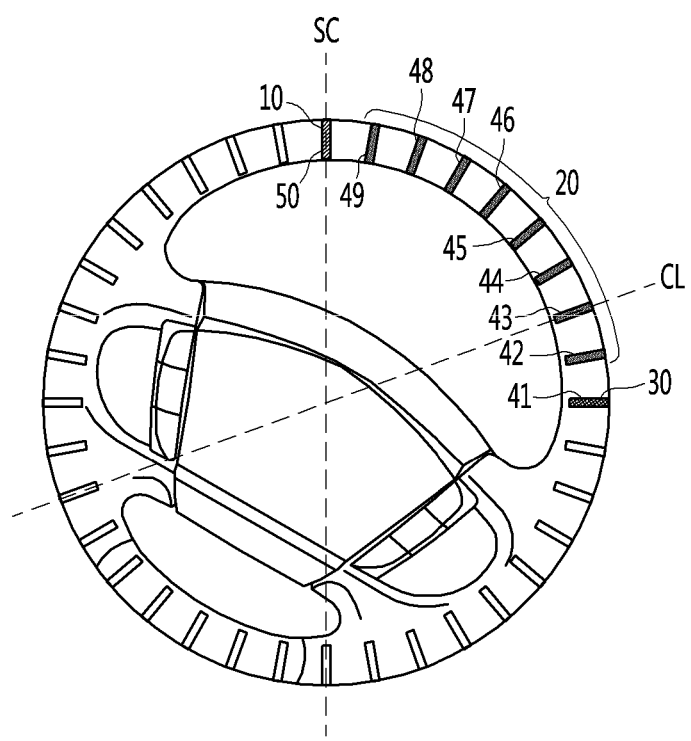

In order for the second turning D2 opposite to the first turning D1 after the vehicle arrives at the first point P1, as illustrated in FIG. 14E, the first to third indicators 10 to 30 may be displayed. Specifically, the target steering direction may be indicated by the third indicator 30 in such a way that a display unit located at a position which passed through the steering center line CL toward the second turning D2 is turned on. In addition, the second indicator 20 may be displayed in such a way that a display unit located between the first indicator 10 indicating the current steering state and the third indicator 30 is turned on.

Figure 14F:
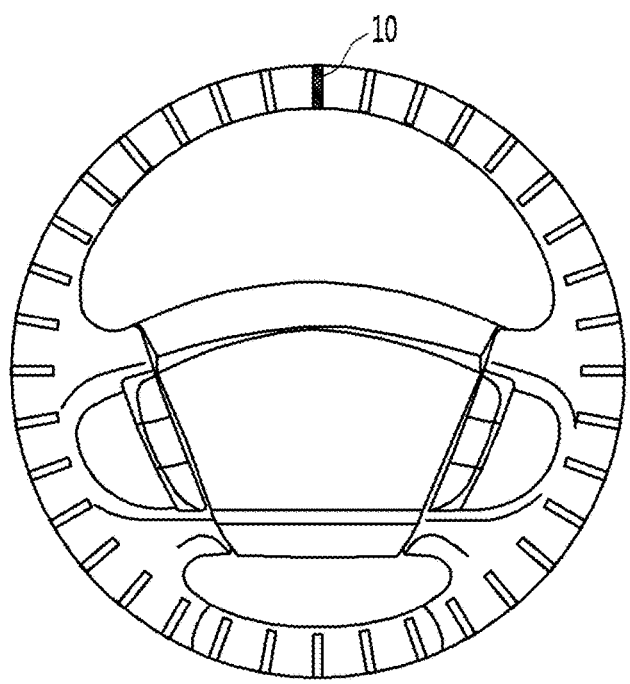

When shift back steering control is completed and the steering is located in the center direction, as illustrated in FIG. 14F, a display unit located in the steering center direction is turned on and the steering control information display function may be ended.

A process by which the third display unit 180c provides steering control information in the situation of FIG. 12 according to another implementation will be described with reference to FIG. 14.

Figure 15A:
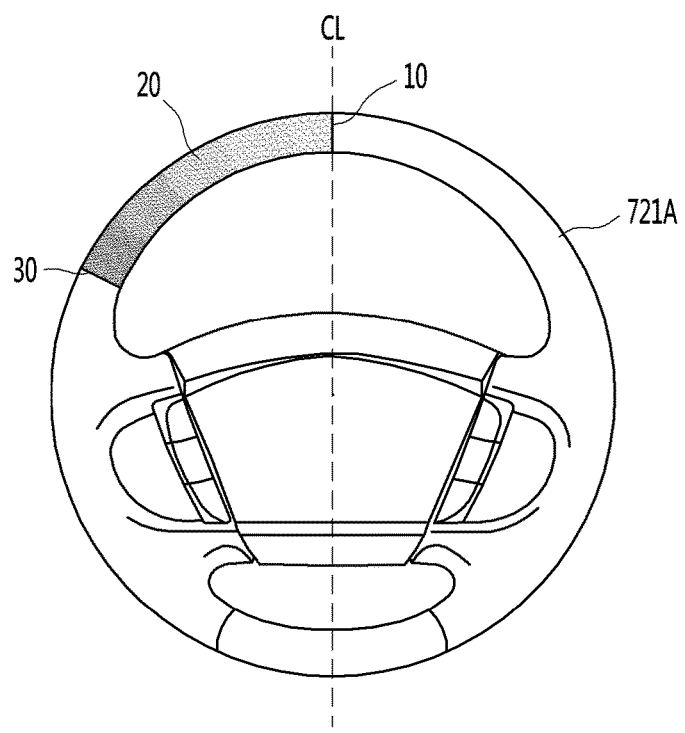
FIGS. 15A to 15F are diagrams illustrating examples in which a third display unit displays steering control information at different positions of a vehicle moving along the turning movement route of FIG. 12, according to another implementation.

At a start point P0 before a first turning D1 is started, as illustrated in FIG. 15A, the first indicator 10 indicating a current steering state may be displayed at the steering center. In addition, the third indicator 30 indicating the target steering direction with respect to a steering direction that is a predicted vehicle wheel direction may be displayed at the first point P1 that is the maximum turning point upon the first turning D1. The second indicator 20 indicating recommended operation direction and speed may be displayed between the first indicator 10 and the third indicator 30. In this case, the second indicator 20 may be displayed by changing at least one of the hue, saturation, luminance, brightness, and size thereof for each position in order to indicate the recommended operation direction and speed. In FIG. 15A, the second indicator 20 is displayed in such a way that the luminance thereof increases from the side of the first indicator 10 to the side of the third indicator 30, thus indicating the recommended direction and speed.

When the steering is controlled, the first indicator 10 may be displayed at a position corresponding to the controlled steering direction.

The second indicator 20 may indicate the recommended operation speed in such a way that the second indicator 20 is gradually shaded from the side of the third indicator 30 to the side of the first indicator 10, with the shading being changed gradually according to the elapse of time.

Figure 15B:
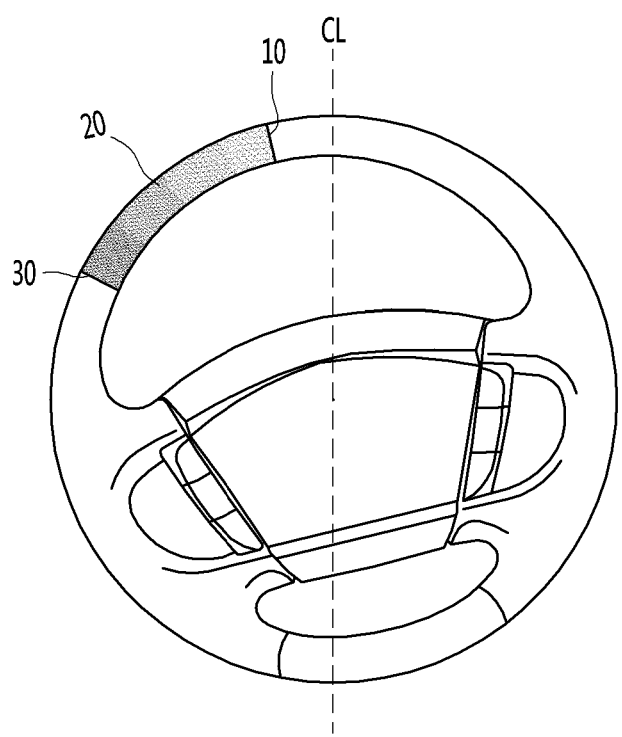
Figure 15C:
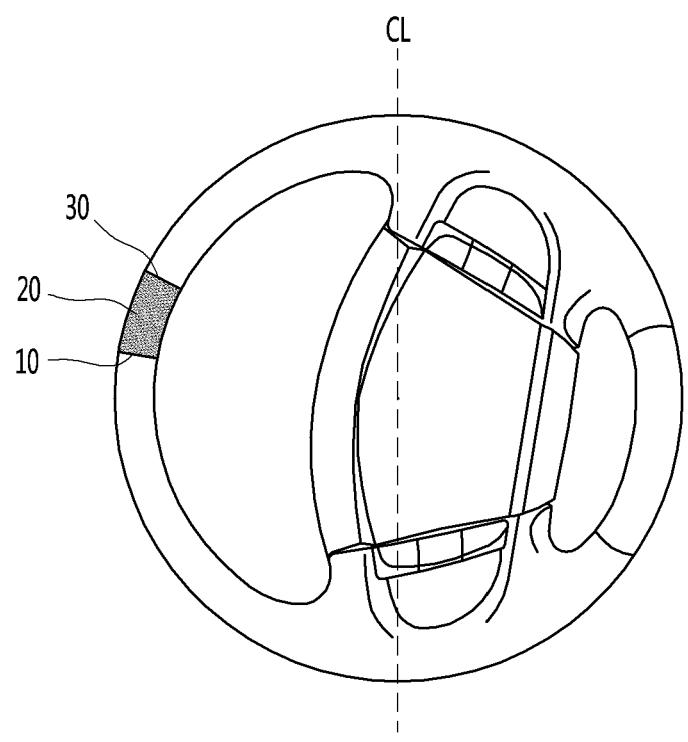

FIG. 15B illustrates a state of the third display unit 180c before the vehicle arrives at the first point P1 by passing through the start point P0 in which the second indicator 20 is shaded from the side of the third indicator 30 to the side of the first indicator 10 according to the elapse of time, and the first indicator 10 indicating the current steering state appropriately follows the second indicator 20 which is shaded. That is, it can be seen that the driver appropriately controls the steering such the first indicator 10 appropriately follows the second indicator 20 which is gradually shaded over time.

Since the current steering state passes through the target steering direction when the over-steering operation is made as illustrated in FIG. 5C, the first indicator 10 is displayed at a corresponding position, and the second indicator 20 is displayed between the third indicator 30 and the first indicator 10, thus displaying an indication that the over-steering is made. In this case, the second indicator 20 may be displayed with a color having a high saturation (for example, red) in order to indicate a warning.

Figure 15D:
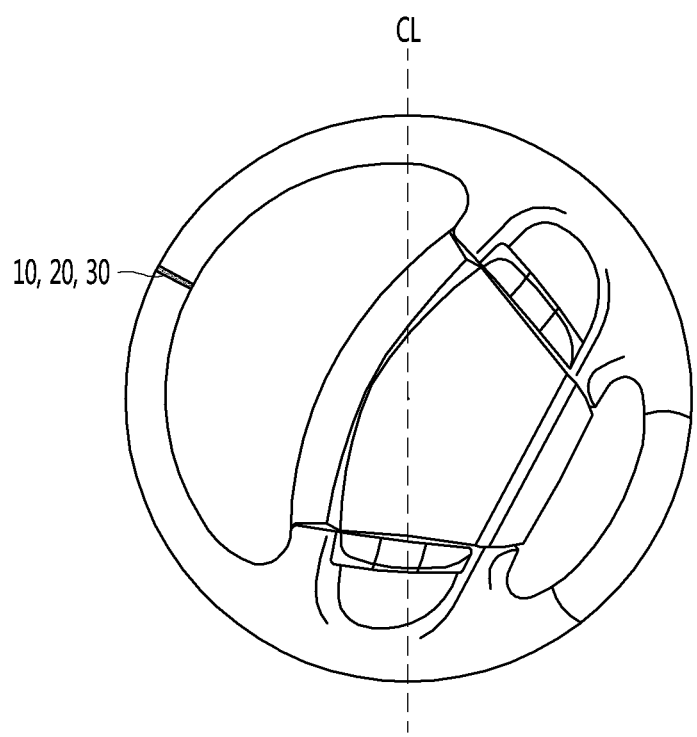

When the driver appropriately controls the steering until the first point P1 to reach the target steering direction, as illustrated in FIG. 15D, the first to third indicators 30 may be displayed to be superimposed on an existing target steering direction.

Figure 15E:
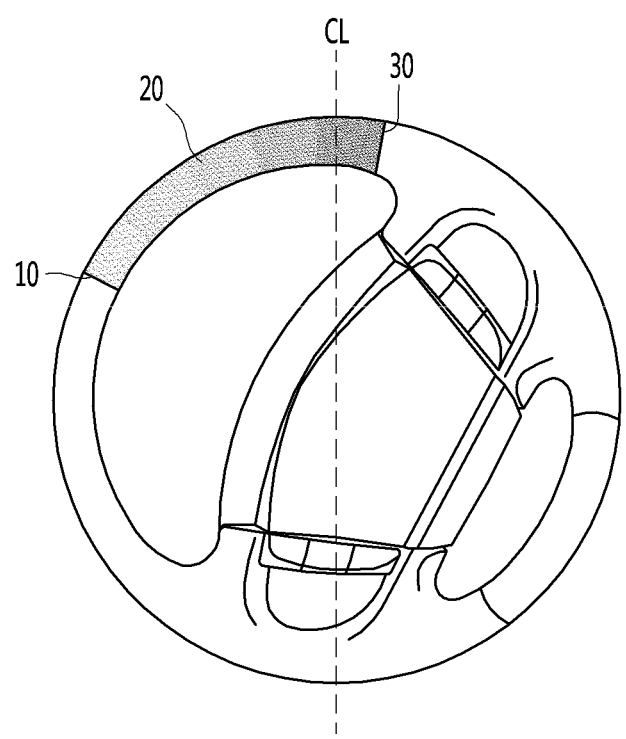
Figure 15F:
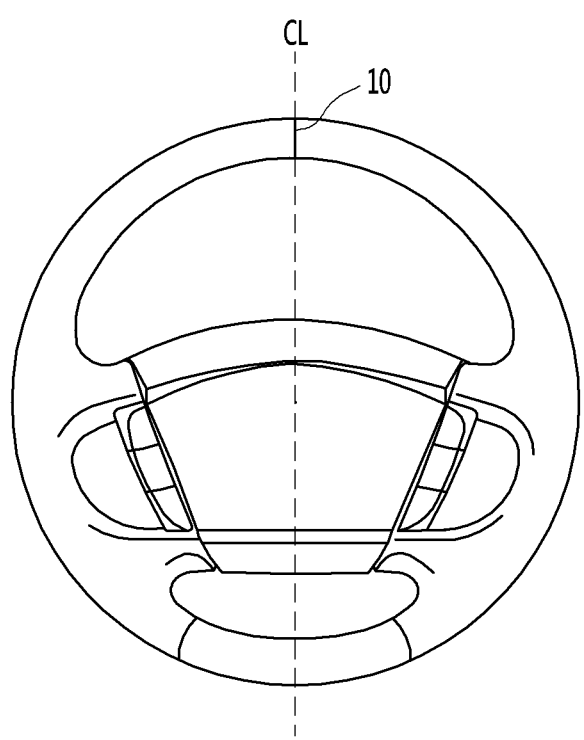

After the vehicle arrives at the first point P1, as illustrated in FIG. 15E, the first to third indicators 30 may be again displayed in order for the second turning D2 opposite to the first turning D1. Specifically, the target steering direction may be indicated by the third indicator 30 at a relevant position which passed through the steering center line CL toward the second turning D2.

In addition, the first indicator 10 indicating the current steering state and the second indicator between the first indicator 10 and the third indicator 30 may be displayed.

When the steering is located in the center direction after the shift-back operation is finished, as illustrated in FIG.

15F, an indicator is displayed in the steering center direction and the steering control information display function may be ended.

As described in the above implementation, the display apparatus 100 provides steering control information based on internal/external information of the vehicle so as to allow a driver to intuitively understand the steering control information to assist the driver in controlling the steering, thus achieving safe turning drive and enhancing the driver's convenience.

Specific examples in which the steering control information is provided will be described below. In this case, redundant description as being the same as the description of the above-described implementations will be omitted for convenience of description.

Figure 16:
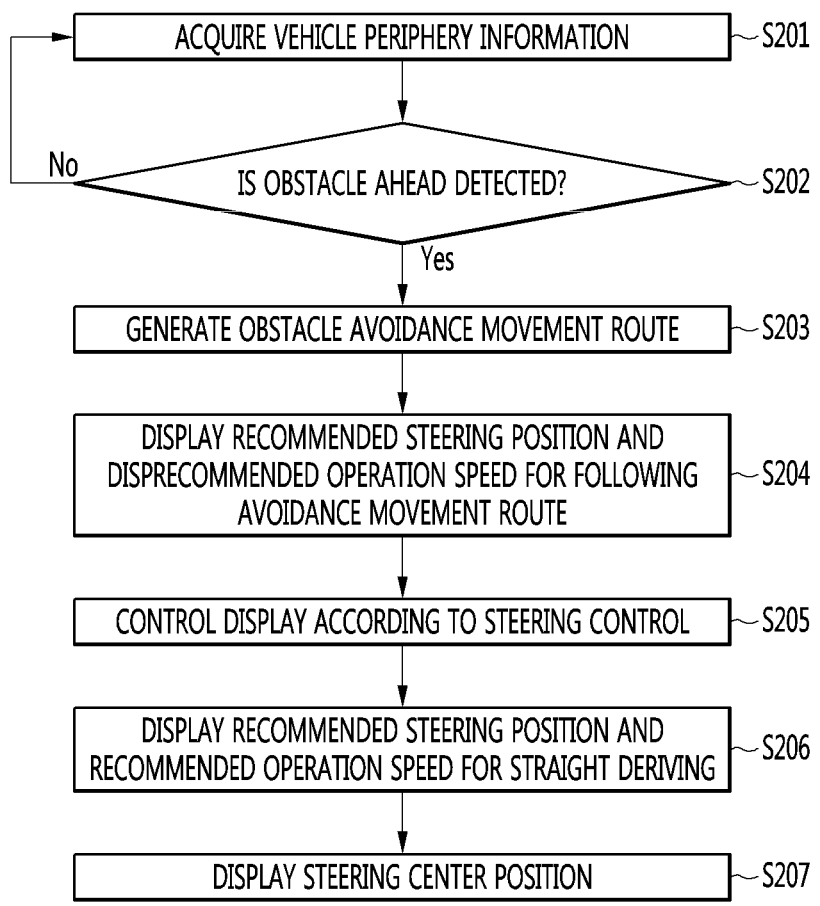
FIG. 16 is a flowchart illustrating an example of providing steering control information to avoid an obstacle after the obstacle is detected.

A process of providing steering control information when it is necessary to avoid an obstacle after the obstacle is detected will be described below with reference to FIGS. 16 to 18.

First, the processor 170 may acquire vehicle periphery information (S201).

Specifically, the processor 170 may acquire information about objects located in the vicinity of the vehicle through the sensor unit.

The processor 170 may detect obstacles from the vehicle periphery information (S202).

Specifically, the processor 170 may detect an object ahead, which has risk of collision, as an obstacle. In this case, the risk of collision may be determined based on the distance and direction to the object from the vehicle, a vehicle speed, a speed of the obstacle, or the like.

When the obstacle is detected, the processor 170 may generate a movement route for avoiding the obstacle based on the vehicle periphery information (S203).

Furthermore, the processor 170 calculates and displays a target steering direction and a recommended operation speed through the first to third indicators 10 to 30 (S204).

Next, the processor 170 changes the display of the first to third indicators 10 to 30 according to steering control (S205).

Figure 17:
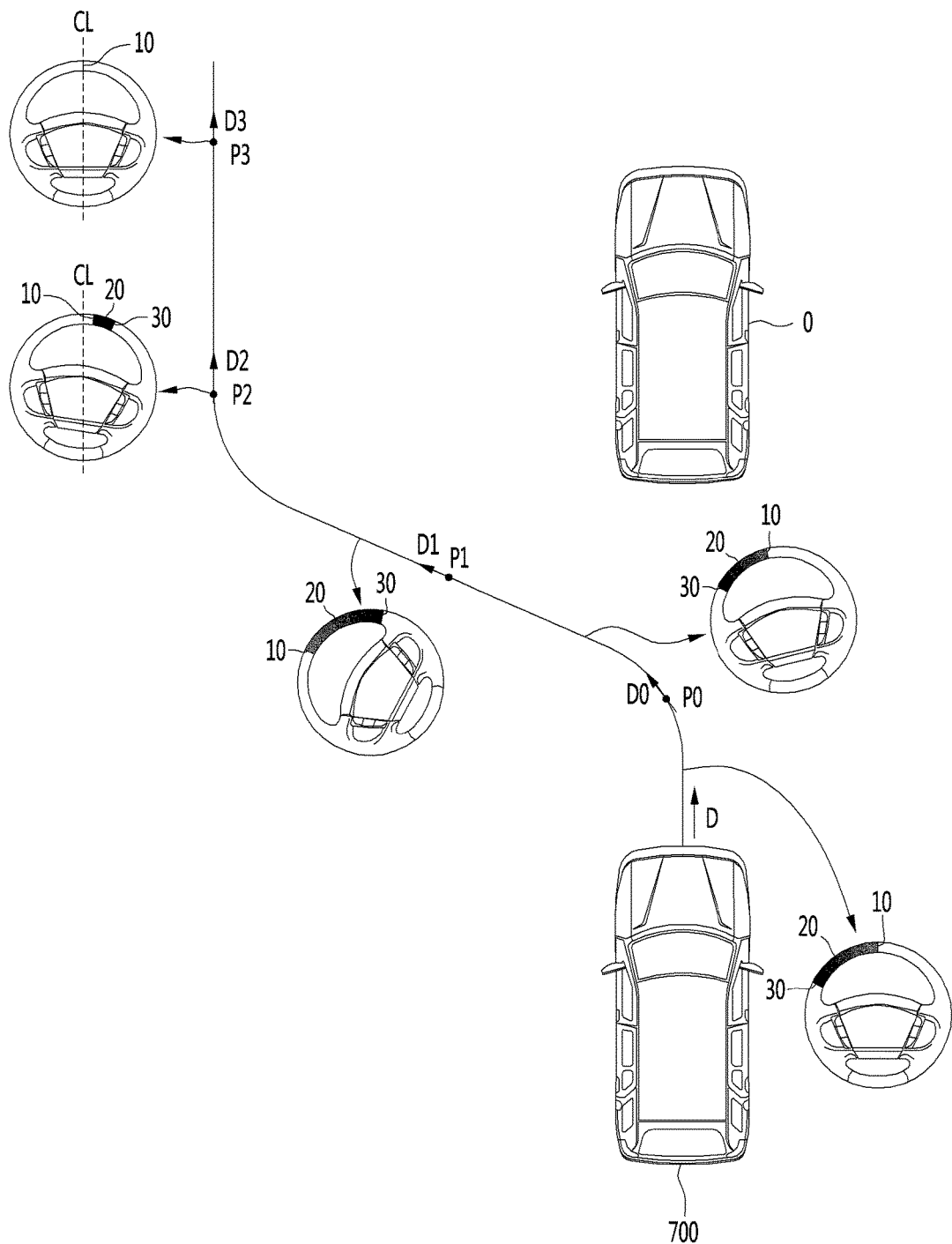
FIG. 17 is a diagram illustrating an example of an obstacle avoidance movement route and steering control information being displayed when the vehicle moves along the obstacle avoidance movement route.

Specifically, referring to FIG. 17, when the vehicle ahead is detected as an obstacle, a predicted movement route for avoiding the vehicle ahead may be calculated. Specifically, the avoidance movement route may be designed to have a path from a start point P0 to a destination point by passing through a first point P1 and a second point P2 and may have at least two times of turnings.

In addition, in a process of following the avoidance movement route, the first to third indicators 10 to 30 are displayed as illustrated in FIG. 17, resulting in the provision of steering control information.

Figure 18:
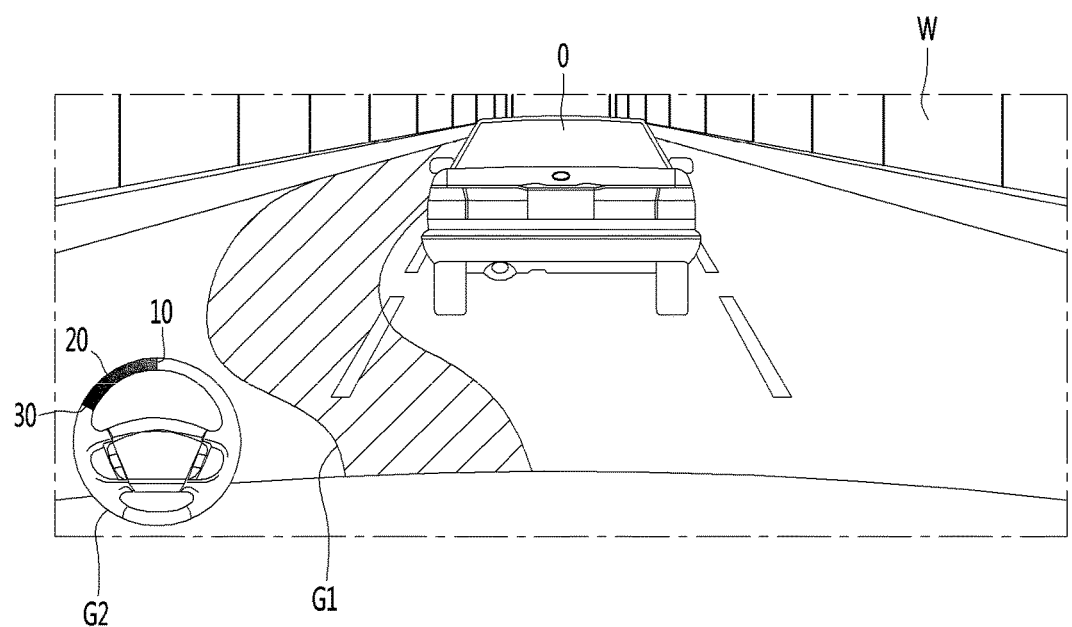
FIG. 18 is a diagram illustrating an example of a first display unit displaying steering control information.
Figure 19:
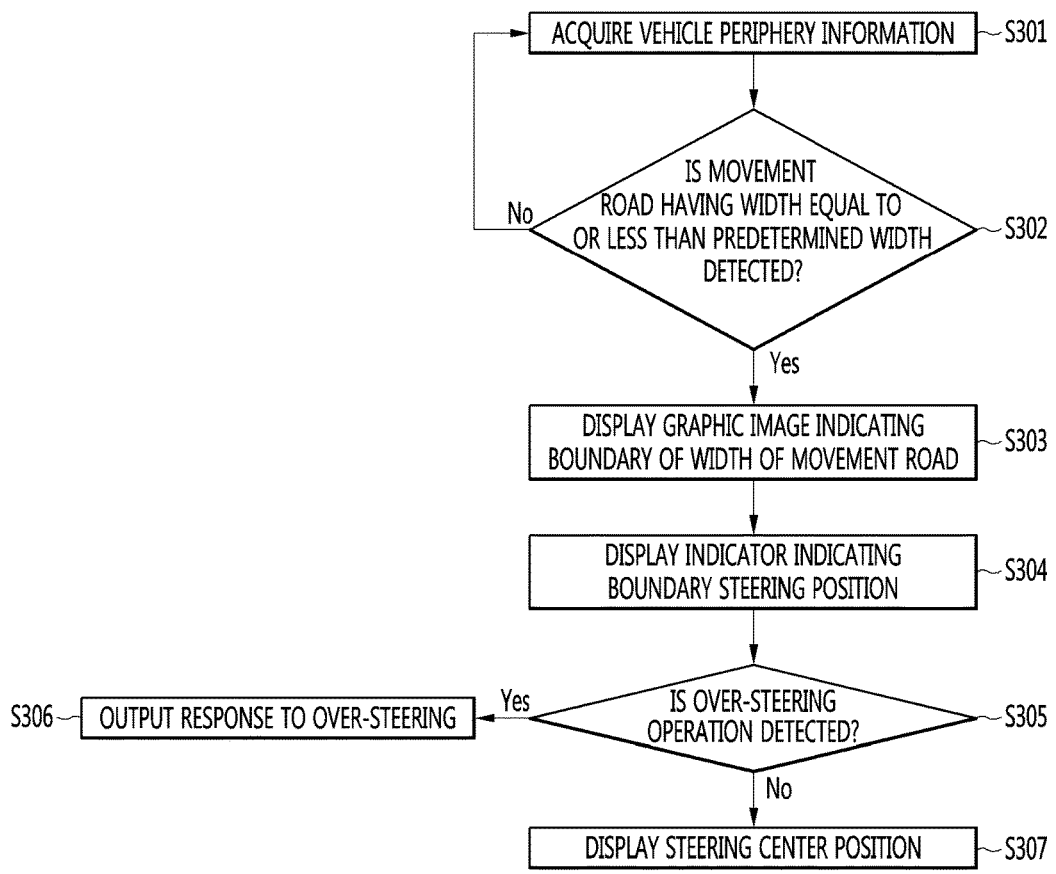
FIG. 19 is a flowchart illustrating an example of providing steering control information in the case of a vehicle passing through a narrow road.

On the other hand, referring to FIG. 18, the first display unit 180a displays a first graphic image representing a recommended movement route and a second graphic image that is a virtual steering image, thus providing the steering control information to the driver more certainly.

A process of providing steering control information in the case of passing through a narrow road will be described below with reference to FIGS. 19 to 23.

First, the processor 170 may acquire vehicle periphery information (S301).

Specifically, the processor 170 may acquire information about objects located in the vicinity of the vehicle through the sensor unit.

The processor 170 may detect whether the vehicle enters a narrow road from the vehicle periphery information (S302).

Figure 20:
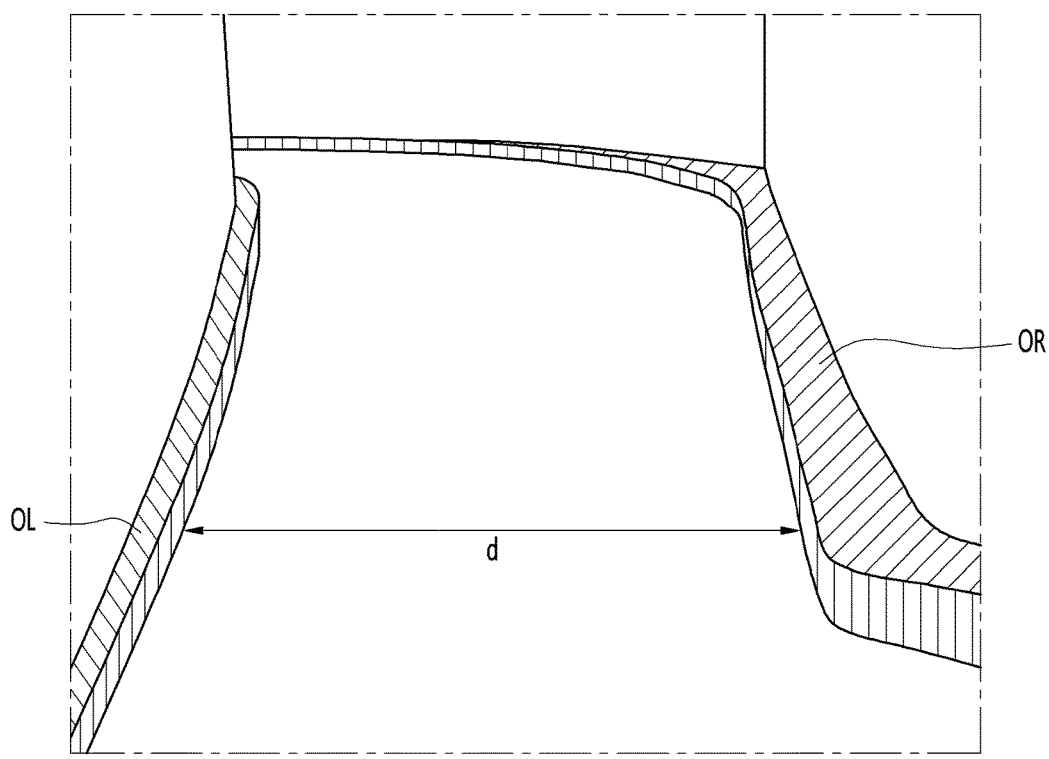
FIG. 20 is a diagram illustrating an example of a situation where a vehicle enters a narrow road.
Figure 21:
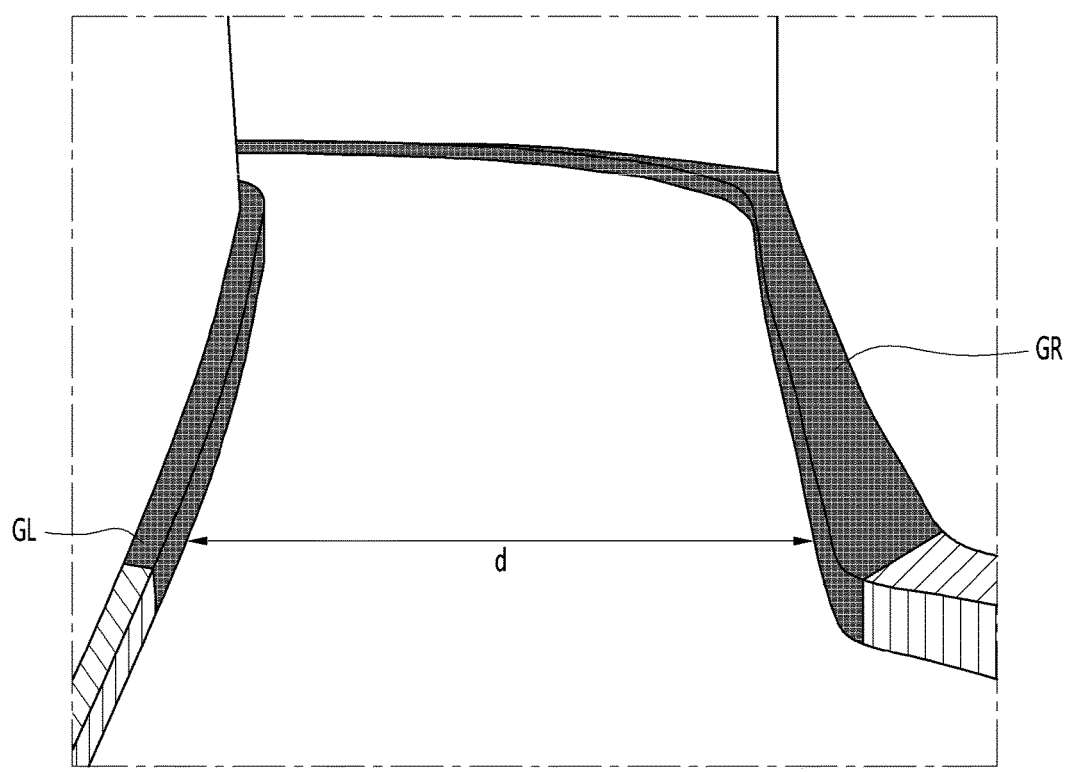
FIG. 21 is a diagram illustrating an example of a first display unit displaying steering control information in the situation of FIG. 20.

Specifically, referring to FIG. 20, the processor 170 detects objects determining left and right limits of the road. When it is detected that a width d between the objects is equal to or less than a predetermined length, the processor 170 may provide steering control information.

When the road is detected as being equal to or less than a predetermined width, the processor 170 may perform control such that the first display unit 180a displays a graphic image indicating boundaries of the width of a movement route on the windshield. Specifically, referring to FIG. 21, the graphic image is displayed to be superimposed on curbs located at the left and right of the road, allowing a driver to certainly recognize the boundaries of the road.

Also, the processor 170 may display boundaries of a steering direction which is movable within the narrow road by using an indicator (S304).

Figure 22:
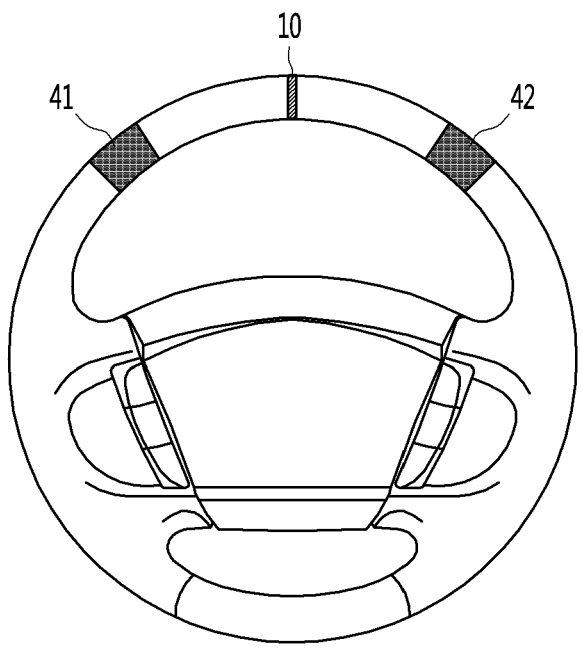
FIG. 22 is a diagram illustrating an example of steering control information being displayed in the situation of FIG. 20.

Specifically, referring to FIG. 22, an indicator 41 indicates a boundary of the steering direction where the vehicle does not collide with a left object and an indicator 42 indicates a boundary of the steering direction where the vehicle does not collide with a right object.

That is, when a steering operation exceeding the indicator 41 is performed, this means that an over-steering operation is made, and the vehicle may collide with the left object.

Also, the processor 170 may detect the over-steering operation in which the first indicator 10 passes through the indicator 41 or the indicator 42 (S305).

Figure 23:
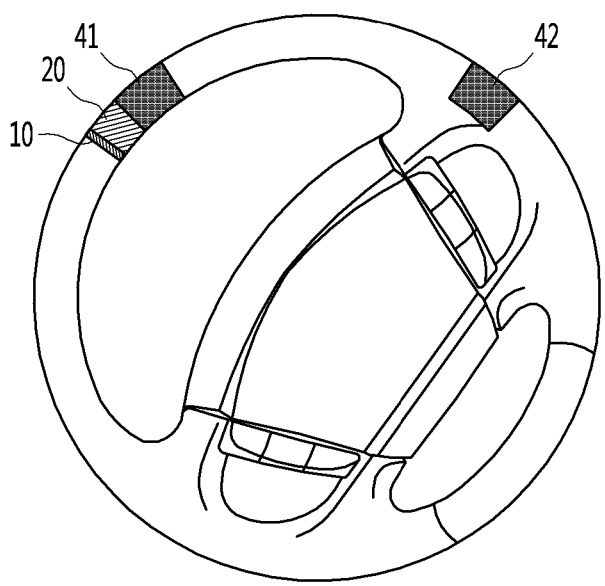
FIG. 23 is a diagram illustrating an example of steering control information being displayed upon over-steering.

Referring to FIG. 23, there is illustrated a state in which the first indicator 10 passes through the indicator 41 because the over-steering operation is made. In this case, it may be possible to alert the over-steering operation by displaying the second indicator 20 therebetween (S306).

In this case, the processor 170 may further provide haptic output or/and audio output to prevent the over-steering operation of the driver.

After the vehicle gets out of the narrow road, an indicator is displayed in the center of the steering, and then the steering information provision function is ended (S307).

The steering information provision function may be provided while the steering is being autonomously controlled.

Figure 24:
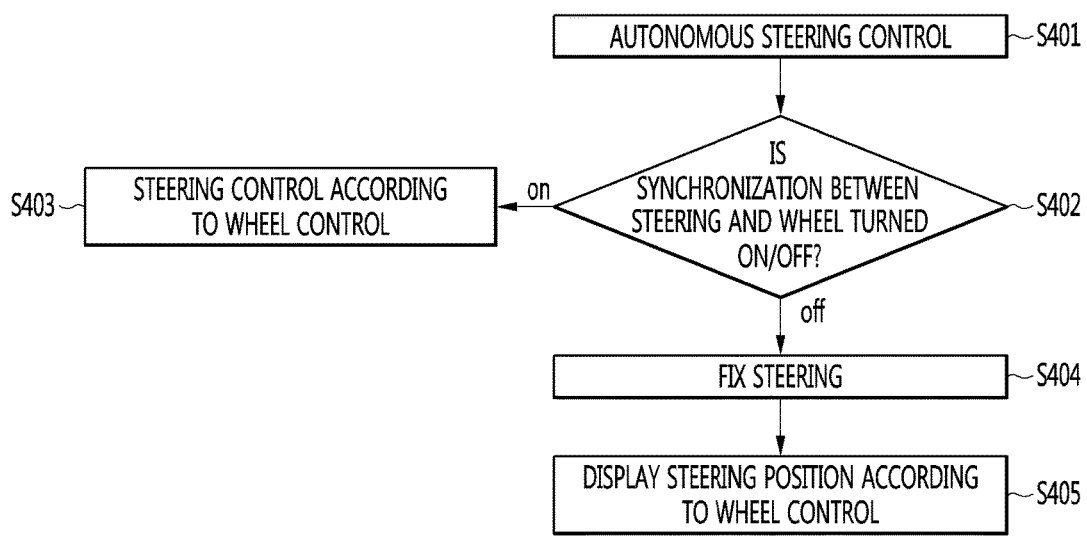
FIG. 24 is a flowchart illustrating an example of displaying steering control information during autonomous control of a steering.

Referring to FIG. 24, the processor 170 may detect a state where the steering is autonomously controlled (S401).

Specifically, the processor 170 may detect the state where the steering input unit (e.g., steering wheel) is autonomously controlled when the vehicle is under autonomous driving, autonomous parking, autonomous vehicle takeout, and remote control.

Also, depending on settings or a user input, the steering may or may not be synchronized with a vehicle wheel direction (S402).

When the direction of a vehicle wheel is changed in a case where the steering is synchronized with a vehicle wheel, the steering is also rotated corresponding to a change in the direction of the vehicle wheel, thus allowing the driver to know that the vehicle wheel is under the control (S403).

However, autonomous rotation of the steering needs unnecessary power consumption, and the user may feel inconvenience in the autonomous rotation of the steering.

Therefore, when the steering is not synchronized with the vehicle wheel, the direction of the vehicle wheel only may be changed in a state where the steering is fixed (S404).

In this case, the processor 170 displays an indicator in a steering direction corresponding to a change in the direction of the vehicle wheel, thus informing the driver that a movement direction of the vehicle is changed and in which direction and at which speed the movement direction of the vehicle is changed (S405).

Figure 25:
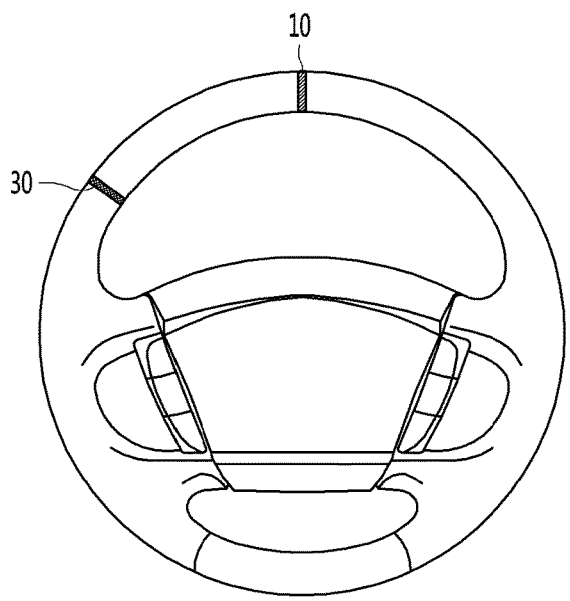
FIG. 25 is a diagram illustrating an example of steering control information being displayed during autonomous control of a steering.

Specifically, referring to FIG. 25, the processor 170 indicates a current direction of the steering by using the first indicator 10 and indicates a target direction to which the vehicle wheel direction is to be changed by using the third indicator 30

Therefore, this display allows the user to know a state of the autonomous steering without displeasure.

Figure 26:
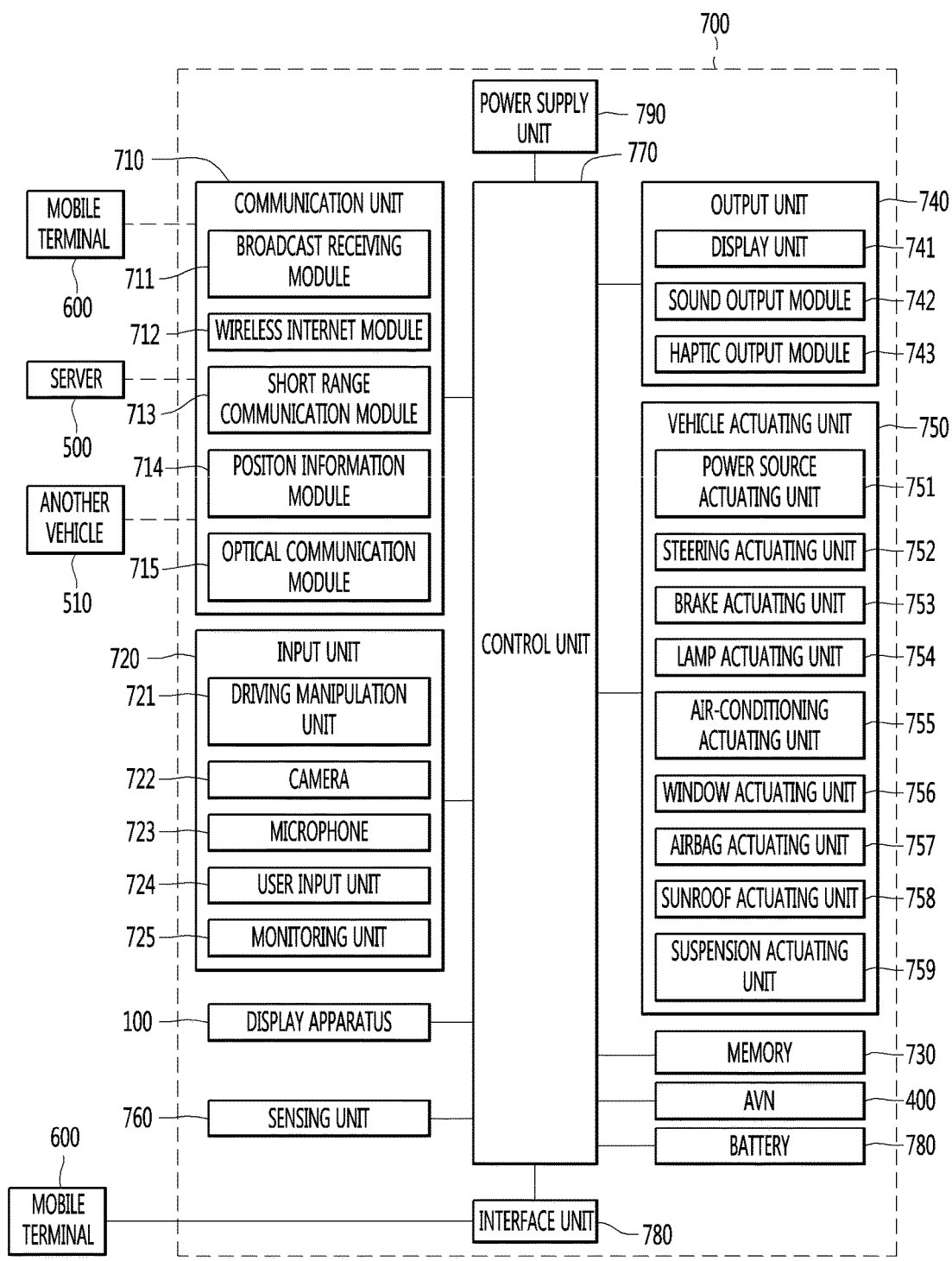
FIG. 26 is a block diagram illustrating an example of an internal configuration of a vehicle having the display apparatus shown in FIG. 1.

Referring to the FIG. 26, the above-described display apparatus 100 may be included in the vehicle.

The vehicle 700 may include a communication unit 710, an input unit 720, a sensing unit 760, an output unit 740, a vehicle drive unit 750, a memory 730, an interface 780, a controller 770, a power supply unit 790, a display apparatus 100 and AVN apparatus 400. Here, among the units included in the display apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 50 or between the vehicle and the other vehicle 510. Further, the communication unit 710 may include one or more modules which connect the vehicle to one or more networks.

The communication unit 710 includes a broadcast receiving module 711, a wireless Internet module 712, a short-range communication module 713, and an optical communication module 715.

The broadcast reception module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 500. The wireless Internet module 72 may receive weather information and road traffic state information (e.g., transport protocol experts group (TPEG) information) from the external server 500.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600.

The short-range communication module 713 may receive weather information and road traffic state information (e.g., transport protocol experts group (TPEG) information) from the mobile terminal 600. When a user rides in the vehicle, the mobile terminal 600 of the user and the vehicle may pair with each other automatically or by executing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module.

The optical communication module 715 may include a light emitting unit and a light reception unit.

The light reception unit may convert a light signal into an electric signal and receive information. The light reception unit may include a photodiode (PD) for receiving light. The photodiode may covert light into an electric signal. For example, the light reception unit may receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light via flickering of the light emitting element corresponding to a prescribed frequency. In some implementations, the light emitting unit may include an array of a plurality of light emitting elements. In some implementations, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 510 via optical communication.

The input unit 720 may include a driving operation unit 721, a camera 195, a microphone 723 and a user input unit 724.

The driving operation unit 721 receives user input for driving of the vehicle (see FIG. 2). The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel that is controlled using rotation. In some implementations, the steering input unit 721A may be configured as a touchscreen, a touch pad, or a button.

The shift input unit 721D is configured to receive input for selecting one of Park (P), Drive (D), Neutral (N), and Reverse (R) gears of the vehicle from the user. The shift input unit 721D may have a lever form. In some implementations, the shift input unit 721D may be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some implementations, the acceleration input unit 721C or the brake input unit 721B may be configured as a touchscreen, a touch pad, or a button.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit 725 for capturing the image of the space inside the vehicle.

The monitoring unit 725 may acquire an image of a passenger. The monitoring unit 725 may acquire an image for biometric information of the passenger.

Although the monitoring unit 725 and the camera 722 are included in the input unit 720 in FIG. X, the camera 722 may be included in the display apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

Meanwhile, in some implementations, a camera 722 or the microphone 723 may not be included in the input unit 720 but may be included in the sensing unit 760.

The user input unit 724 is configured to receive information from the user. When information is input via the user input unit 724, the controller 770 may control the operation of the vehicle to correspond to the input information. The user input unit 724 may include a touch input unit or a mechanical input unit. In some implementations, the user input unit 724 may be located in a region of the steering input unit (e.g., steering wheel). In this case, the driver may operate the user input unit 724 with the fingers while gripping the steering input unit.

The sensing unit 760 is configured to sense signals associated with, for example, signals related to driving of the vehicle. To this end, the sensing unit 760 may include a collision sensor, a vehicle wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering input unit (e.g., steering wheel), a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, rotation angle information of the steering input unit (e.g., steering wheel), etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 may operate as a sensor. The biometric sensor may acquire hand geometry information and facial recognition information through the monitoring unit 725.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some implementations, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the controller 170 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering input unit, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of a power source inside the vehicle.

For example, in the case where a fossil fuel based engine (not illustrated) is a power source, the power source drive unit 751 may perform electronic control of the engine. As such, the power source drive unit 751 may control, for example, an output torque of the engine. In the case where the power source drive unit 751 is an engine, the power source drive unit 751 may control the speed of the vehicle by controlling the output torque of the engine under the control of the controller 770.

In another example, in the case where an electric motor (not illustrated) is a power source, the power source drive unit 751 may perform control of the motor. As such, the power source drive unit 751 may control, for example, the RPM and torque of the motor.

The steering drive unit 752 may perform electronic control of a steering apparatus inside the vehicle. The steering drive unit 752 may change the direction of travel of the vehicle.

The brake drive unit 753 may perform electronic control of a brake apparatus (not illustrated) inside the vehicle. For example, the brake drive unit 753 may reduce the speed of the vehicle by controlling the operation of brakes located at vehicle wheels. In another example, the brake drive unit 753 may adjust the direction of travel of the vehicle leftward or rightward by differentiating the operation of respective brakes located at left and right vehicle wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 may perform control of a turn signal lamp or a brake lamp.

The air conditioner drive unit 755 may perform electronic control of an air conditioner (not illustrated) inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform the electronic control of an airbag apparatus inside the vehicle. For example, the airbag drive unit 757 may control an airbag to be deployed in a dangerous situation.

The sunroof drive unit 758 may perform electronic control of a sunroof apparatus (not illustrated) inside the vehicle. For example, the sunroof drive unit 758 may control opening or closing of a sunroof.

The suspension drive unit 759 may perform electronic control of a suspension apparatus (not shown) inside the vehicle. For example, when a road surface is uneven, the suspension drive unit 759 may control the suspension apparatus to reduce vibrations of the vehicle.

The memory 730 is electrically connected to the controller 770. The memory 730 may store basic data of the unit, control data for operation control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 via the port. In this case, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply unit 790 to the mobile terminal 600 under control of the controller 770.

The controller 770 may control the overall operation of each unit inside the vehicle. The controller 770 may be referred to as an Electronic Control Unit (ECU).

The controller 770 may perform a function corresponding to the delivered signal according to delivery of a signal for executing the display apparatus 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 may perform the role of the above-described processor 170. That is, the processor 170 of the display apparatus 100 may be directly set in the controller 770 of the vehicle. In such an implementation, the display apparatus 100 may be understood as a combination of some components of the vehicle.

Alternatively, the controller 770 may control the components to transmit information requested by the processor 170.

The power supply unit 790 may supply power required to operate the respective components under the control of the controller 770. In particular, the power supply unit 790 may receive power from, for example, a battery (not illustrated) inside the vehicle.

The AVN apparatus 400 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

The display apparatus according to the implementations provides appropriate steering control information based on internal/external information of the vehicle so as to allow a driver to intuitively understand the steering control information to assist the driver in controlling a steering, thus achieving safe turning drive and aiding in a steering operation of the driver.

Specifically, the display apparatus displays the target steering position when steering control is necessary and displays a recommended operation speed of a steering operation for changing the current steering state to an optimal steering position, thus allowing the driver to perform a steering operation at an appropriate operation steep until the current steering state reaches the optimal steering position.

Therefore, the vehicle can stably move along the predicted movement route through appropriate steering control corresponding to a situation.

The above described features, configurations, effects, and the like are included in at least one of the implementations, and should not be limited to only one implementation. In addition, the features, configurations, effects, and the like as illustrated in each implementation may be implemented with regard to other implementations as they are combined with one another or modified by those skilled in the art. Thus, content related to these combinations and modifications should be construed as including in the scope and spirit of the invention as disclosed in the accompanying claims.

Further, although the implementations have been mainly described until now, they are just exemplary and do not limit the present invention. Thus, those skilled in the art to which the present invention pertains will know that various modifications and applications which have not been exemplified may be carried out within a range which does not deviate from the essential characteristics of the implementations. For instance, the constituent elements described in detail in the exemplary implementations can be modified to be carried out. Further, the differences related to such modifications and applications shall be construed to be included in the scope of the present invention specified in the attached claims.

What is claimed is:

1. A display apparatus comprising:
a sensor unit configured to acquire vehicle periphery information;
an interface unit configured to acquire vehicle state information;
a display unit configured to display a first indicator indicating a current steering direction, a third indicator indicating a target steering state, and a second indicator displayed at a position between the first indicator and the third indicator; and
a processor configured to determine the target steering direction based on the vehicle state information and the vehicle periphery information.

2. The display apparatus of claim 1, wherein the processor is further configured to:
detect, based on the vehicle periphery information, a movement route for a vehicle including at least one turning operation; and
determine the target steering direction according to the movement route.

3. The display apparatus of claim 2, wherein the processor is further configured to:
detect a turning direction from the movement route; and
determine, as the target steering direction, a direction that is turned by more than a predetermined angle relative to the turning direction detected from the movement route.

4. The display apparatus of claim 1, wherein the current steering state is a state where a vehicle wheel is steered with respect to a heading direction of a vehicle.

5. The display apparatus of claim 1, wherein the second indicator indicates a recommended steering speed by displaying a gradual shading that changes over time in a direction from the first indicator towards the third indicator.

6. The display apparatus of claim 1, wherein the processor is further configured to control the display unit so as to change a display position of at least one of the first indicator, the second indicator, or the third indicator when a steering operation is detected.

7. The display apparatus of claim 6, wherein the processor is further configured to:
change a display position of the first indicator so as to indicate a vehicle wheel direction which is changed according to the steering operation; and
control the display unit to display the first indicator at the changed display position.

8. The display apparatus of claim 6, wherein the processor is further configured to:
shift, in a direction that is opposite the direction of steering, a position at which the third indicator is displayed according to the steering operation; and
perform control such that the display unit displays the third indicator at the position which is shifted opposite the direction of steering,
wherein the third indicator is displayed at the position which is shifted opposite the direction of steering such that the third indicator is maintained as being displayed at a fixed position with respect to a center position of steering.

9. The display apparatus of claim 8, wherein the processor is further configured to:
shift, in the direction that is opposite the direction of steering, a position at which the second indicator is displayed according to the steering operation; and
perform control such that the display unit displays the second indicator at the position which is shifted opposite the direction of steering,
wherein the second indicator is displayed at the position which is shifted opposite the direction of steering such that the second indicator is maintained as being displayed at a fixed position with respect to the center position of steering.

10. The display apparatus of claim 6, wherein the processor is further configured to control the display unit such that the second indicator designates a rotation of the steering by at least one full rotation based on detecting that rotation of the steering by at least one full rotation achieves a change in position of the first indicator to a position of the third indicator.

11. The display apparatus of claim 1, wherein the processor is further configured to control the display unit such that the second indicator indicates an over-steering operation based on the first indicator passing through a position of the third indicator.

12. The display apparatus of claim 11, further comprising a haptic output unit configured to output a haptic signal through a steering input unit,
wherein the processor is further configured to perform control such that the haptic output unit outputs a haptic that resists against the over-steering operation based on the over-steering operation being detected.

13. The display apparatus of claim 12, wherein the processor is further configured to perform control such that haptic output unit stops the output of the haptic when a steering operation exceeding a predetermined force is detected after outputting the haptic that resists against the over-steering operation.

14. The display apparatus of claim 11, further comprising an audio output unit that is disposed at a left side or a right side of a user, and that is configured to output an alarm,
wherein the processor is further configured to control the audio output unit to output a directional alarm indicating the over-steering operation based on the over-steering operation being detected.

15. The display apparatus of claim 1, wherein the display unit comprises:
   a first display unit configured to display an indicator on a windshield of a vehicle;
   a second display unit configured to display the indicator, the second display unit being a display of a navigation device of the vehicle or a cluster disposed on a front of the vehicle; and
   a third display unit disposed on a steering input unit and configured to display the indicator.

16. The display apparatus of claim 15, wherein the first display unit is further configured to:
   display a virtual steering image on the windshield; and
   display the first indicator, the second indicator, and the third indicator on the virtual steering image.

17. The display apparatus of claim 16, wherein the first display unit is configured to further display at least one of a first graphic image representing a recommended movement route or a second graphic image representing a movement route based on the current steering state.

18. The display apparatus of claim 16, wherein the third display unit is further configured to:
   display the first indicator, the second indicator, and the third indicator directly on the steering input unit; and
   shift a display position of each of the first indicator, the second indicator, and the third indicator based on the steering input unit being rotated.

19. The display apparatus of claim 1, wherein the processor is further configured to:
   based on detecting an obstacle ahead from the vehicle periphery information, calculate an avoidance movement route including a turning operation to avoid the obstacle; and
   control the display unit to display the first indicator, the second indicator, and the third indicator according to the calculated avoidance movement route.

20. The display apparatus of claim 1, wherein the processor is further configured to:
   based on detecting a curve in a road, calculate the first indicator, the second indicator, and the third indicator based on a direction of the detected curve in the road; and
   control the display unit to display the calculated first indicator, the second indicator, and the third indicator.

21. The display apparatus of claim 1, wherein the processor is further configured to:
   based on an autonomous steering operation being performed, maintain a steering input unit at a fixed rotation angle; and
   control the display unit to display at least one of the first indicator, the second indicator, or the third indicator on the steering input unit without rotation of the steering input unit.

22. A vehicle comprising the display apparatus of claim 1.

* * * * *